US012564925B2

(12) United States Patent
Bierdeman et al.

(10) Patent No.: US 12,564,925 B2
(45) Date of Patent: Mar. 3, 2026

(54) GAS SPRING-POWERED FASTENER DRIVER

(71) Applicant: MILWAUKEE ELECTRIC TOOL CORPORATION, Brookfield, WI (US)

(72) Inventors: David Bierdeman, New Berlin, WI (US); Andrew R. Wyler, Pewaukee, WI (US); Nicholas A. Albers, Portland, OR (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1049 days.

(21) Appl. No.: 16/437,621

(22) Filed: Jun. 11, 2019

(65) Prior Publication Data

US 2019/0375084 A1 Dec. 12, 2019

Related U.S. Application Data

(60) Provisional application No. 62/683,460, filed on Jun. 11, 2018.

(51) Int. Cl.
*B25C 1/04* (2006.01)
*B25C 1/06* (2006.01)

(52) U.S. Cl.
CPC .............. *B25C 1/047* (2013.01); *B25C 1/041* (2013.01); *B25C 1/06* (2013.01)

(58) Field of Classification Search
CPC .......... B25C 1/047; B25C 1/06; B25C 1/041; B25C 1/08; B25C 1/003; B25C 7/00; B25C 5/15; B25C 5/1693

(Continued)

(56) References Cited

U.S. PATENT DOCUMENTS 2,801,415 A 8/1957 Jenny
2,801,417 A 8/1957 Jenny (Continued)

FOREIGN PATENT DOCUMENTS

CN 101486180 X 7/2009
CN 102554878 B 7/2012

(Continued)

OTHER PUBLICATIONS

International Search Report for International Application No. PCT/US2019/036520 dated Sep. 25, 2019 (4 pages).

(Continued)

*Primary Examiner* — Robert F Long
(74) *Attorney, Agent, or Firm* — Michael Best & Friedrich LLP

(57) ABSTRACT

A gas spring-powered fastener driver includes an outer cylinder, an inner cylinder positioned within the outer cylinder, and a moveable piston positioned within the inner cylinder. The gas spring-powered fastener driver further includes a driver blade attached to the piston and movable therewith between a top-dead-center (TDC) position and a driven or bottom-dead-center (BDC) position. The outer cylinder and the inner cylinder define a first total volume in which gas is located when the driver blade is in the TDC position. The outer cylinder and the inner cylinder define a second total volume, in which gas is located when the driver blade is in the BDC position. A compression ratio of the second total volume to the first total volume is 1.7:1 or less. And, a force acting on the driver blade when located in the TDC position is at least 90 pound-force (lbf) but no more than 450 pound-force (lbf).

16 Claims, 18 Drawing Sheets

(58) Field of Classification Search
USPC .................... 173/90, 197, 213, 171; 227/130
See application file for complete search history.

(56) References Cited

U.S. PATENT DOCUMENTS

| | | | |
|---|---|---|---|
| 2,801,418 | A | 8/1957 | Jenny |
| 2,850,738 | A | 9/1958 | Campbell et al. |
| 3,049,715 | A | 8/1962 | Allen |
| 3,190,187 | A | 6/1965 | Doyle |
| 3,198,412 | A | 8/1965 | Roosa |
| 3,496,840 | A | 2/1970 | Wandel et al. |
| 3,673,922 | A | 7/1972 | Doyle |
| 3,760,695 | A | 9/1973 | Rothfuss |
| 3,776,445 | A | 12/1973 | Pomeroy |
| 3,945,120 | A * | 3/1976 | Ritz ..................... B23D 49/165 30/393 |
| 3,952,814 | A | 4/1976 | Gelfand et al. |
| 3,969,989 | A | 7/1976 | Maurer et al. |
| 4,129,240 | A * | 12/1978 | Geist ......................... B25C 1/06 227/8 |
| 4,197,974 | A | 4/1980 | Morton et al. |
| 4,441,644 | A | 4/1984 | Farian |
| 4,442,670 | A * | 4/1984 | Goldman .................. F02G 1/04 60/508 |
| 4,463,888 | A | 8/1984 | Geist et al. |
| 4,510,894 | A * | 4/1985 | Williams ................ F02B 75/26 123/48 AA |
| 4,624,401 | A | 11/1986 | Gassner et al. |
| 4,739,915 | A * | 4/1988 | Cotta ........................ B25C 1/08 227/10 |
| 4,753,115 | A * | 6/1988 | Moody .................... G01N 3/08 73/826 |
| 4,879,875 | A * | 11/1989 | Davert .................... B25B 31/00 60/588 |
| 5,025,971 | A | 6/1991 | Schafer et al. |
| 5,091,123 | A | 2/1992 | Fealey |
| 5,138,908 | A | 8/1992 | Raetz et al. |
| 5,197,647 | A | 3/1993 | Howell |
| 5,219,110 | A | 6/1993 | Mukoyama |
| 5,297,713 | A | 3/1994 | Perra et al. |
| 5,309,714 | A * | 5/1994 | Putney .................. B25B 21/004 173/219 |
| 5,322,189 | A | 6/1994 | Oda |
| 5,433,367 | A | 7/1995 | Liu |
| 5,441,192 | A | 8/1995 | Sugita et al. |
| 5,720,423 | A | 2/1998 | Kondo et al. |
| 5,722,643 | A * | 3/1998 | Chamberlin .............. F16F 9/02 188/277 |
| 5,853,211 | A * | 12/1998 | Sawdon ............... B25J 15/0226 294/116 |
| 5,924,671 | A * | 7/1999 | Baumann .............. F15B 15/066 251/62 |
| 5,937,683 | A | 8/1999 | Chartier |
| 5,951,449 | A * | 9/1999 | Oppriecht .......... A63B 21/0087 482/113 |
| 6,012,622 | A | 1/2000 | Weinger et al. |
| 6,076,799 | A * | 6/2000 | Baumann ............ F16K 31/5282 251/285 |
| 6,168,093 | B1 * | 1/2001 | Greer, Jr. .............. B05B 9/0861 239/596 |
| 6,176,412 | B1 | 1/2001 | Weinger et al. |
| 6,179,192 | B1 | 1/2001 | Weinger et al. |
| 6,267,284 | B1 | 7/2001 | Clark |
| 6,296,167 | B1 | 10/2001 | Jen |
| 6,357,534 | B1 | 3/2002 | Buetow et al. |
| 6,679,411 | B2 | 1/2004 | Popovich et al. |
| 6,698,200 | B1 * | 3/2004 | Rauen ..................... F01B 29/10 60/520 |
| 6,705,503 | B1 * | 3/2004 | Pedicini .................... B25C 1/06 173/205 |
| 7,064,462 | B2 * | 6/2006 | Hempe .................. B23D 45/16 173/217 |
| 7,175,064 | B2 | 2/2007 | Schell et al. |
| 7,201,301 | B2 * | 4/2007 | Moeller .................... B25C 1/08 123/46 SC |
| 7,225,768 | B2 | 6/2007 | Akiba et al. |
| 7,284,685 | B1 | 10/2007 | Wojcicki |
| 7,299,959 | B2 | 11/2007 | Ishizawa et al. |
| 7,314,025 | B2 | 1/2008 | Shkolnikov et al. |
| 7,316,209 | B2 | 1/2008 | Akiba et al. |
| 7,320,422 | B2 | 1/2008 | Schell et al. |
| 7,383,974 | B2 * | 6/2008 | Moeller .................... B25C 1/08 227/8 |
| 7,407,071 | B2 | 8/2008 | Sperrfechter et al. |
| 7,516,532 | B2 | 4/2009 | Wojcicki |
| 7,549,562 | B2 | 6/2009 | Wu et al. |
| 7,584,723 | B2 | 9/2009 | Schkolnikov et al. |
| 7,591,236 | B2 | 9/2009 | Moeller et al. |
| 7,712,647 | B2 | 5/2010 | Tanji |
| 7,726,533 | B2 | 6/2010 | Wojcicki |
| 7,909,221 | B2 * | 3/2011 | Viola ................... A61B 17/068 227/176.1 |
| 8,011,441 | B2 | 9/2011 | Leimbach et al. |
| 8,011,547 | B2 | 9/2011 | Leimbach et al. |
| 8,074,855 | B2 | 12/2011 | Johnson |
| 8,230,941 | B2 | 7/2012 | Leimbach et al. |
| 8,267,296 | B2 | 9/2012 | Leimbach et al. |
| 8,267,297 | B2 | 9/2012 | Leimbach et al. |
| 8,286,722 | B2 | 10/2012 | Leimbach et al. |
| 8,292,144 | B2 | 10/2012 | Maltais et al. |
| 8,336,748 | B2 | 12/2012 | Hlinka et al. |
| 8,387,718 | B2 | 3/2013 | Leimbach et al. |
| 8,387,845 | B2 | 3/2013 | Franz |
| 8,397,967 | B2 | 3/2013 | Calvet et al. |
| 8,408,438 | B2 | 4/2013 | Taylor |
| 8,418,587 | B2 | 4/2013 | DeBaker |
| 8,556,148 | B2 | 10/2013 | Schell et al. |
| 8,567,654 | B2 | 10/2013 | Wu et al. |
| 8,602,282 | B2 | 12/2013 | Leimbach et al. |
| 8,733,609 | B2 | 5/2014 | Weigmann et al. |
| 8,746,526 | B2 | 6/2014 | Hlinka et al. |
| 8,763,874 | B2 | 7/2014 | Mccardle et al. |
| 8,844,787 | B2 | 9/2014 | Shima et al. |
| 8,899,460 | B2 | 12/2014 | Wojcicki |
| 9,126,318 | B2 | 9/2015 | Cheung et al. |
| 9,469,021 | B2 | 10/2016 | Gregory et al. |
| 9,486,904 | B2 | 11/2016 | Gregory et al. |
| 9,492,915 | B2 * | 11/2016 | Largo ........................ B25C 1/08 |
| 9,498,871 | B2 | 11/2016 | Gregory et al. |
| 9,539,714 | B1 | 1/2017 | Pedicini |
| 9,643,305 | B2 | 5/2017 | Gregory et al. |
| 9,649,755 | B2 | 5/2017 | Gregory et al. |
| 9,664,045 | B2 | 5/2017 | Mina et al. |
| 9,676,041 | B2 | 6/2017 | Allen |
| 9,676,088 | B2 | 6/2017 | Leimbach et al. |
| 9,827,658 | B2 | 11/2017 | Gregory et al. |
| 9,868,196 | B2 | 1/2018 | Chien |
| 9,912,020 | B2 * | 3/2018 | Glasgow ............. H01M 10/643 |
| 10,126,107 | B2 | 11/2018 | Khangar et al. |
| 10,173,310 | B2 | 1/2019 | Wyler et al. |
| 10,654,155 | B2 * | 5/2020 | Meyer ..................... B25C 1/008 |
| 10,821,591 | B2 * | 11/2020 | Verbrugge ................ B25F 5/00 |
| 2002/0144498 | A1 * | 10/2002 | Adams ...................... B25C 1/08 60/39.6 |
| 2003/0121948 | A1 | 7/2003 | Hsien |
| 2004/0150137 | A1 * | 8/2004 | Palmer ................... A23G 1/005 264/319 |
| 2005/0194419 | A1 | 9/2005 | Smolinski et al. |
| 2006/0086210 | A1 * | 4/2006 | Kingham ................ B25C 11/00 81/45 |
| 2006/0175373 | A1 * | 8/2006 | Erhardt ..................... B25C 1/08 227/10 |
| 2006/0175374 | A1 * | 8/2006 | Zahner ...................... B25C 1/08 227/10 |
| 2006/0180631 | A1 | 8/2006 | Pedicini et al. |
| 2006/0186171 | A1 * | 8/2006 | Porth .................... B25C 5/1627 227/136 |
| 2007/0034659 | A1 * | 2/2007 | Moeller .................... B25C 1/08 227/8 |
| 2007/0187452 | A1 | 8/2007 | Budzisz |
| 2007/0210134 | A1 | 9/2007 | Oda et al. |

(56) References Cited

U.S. PATENT DOCUMENTS

2007/0271761 A1* 11/2007 Haytayan .............. B25B 21/002 29/432
2008/0067212 A1 3/2008 Wen
2008/0179371 A1* 7/2008 Gardner .................... F16L 3/04 227/1
2008/0190986 A1 8/2008 Chang et al.
2008/0190988 A1* 8/2008 Pedicini .................... B25C 1/04 227/130
2009/0090759 A1* 4/2009 Leimbach ............... B25C 1/047 227/10
2009/0194573 A1 8/2009 Liang et al.
2009/0250500 A1 10/2009 Brendel et al.
2009/0321495 A1* 12/2009 Hirabayashi .............. B25C 1/06 227/156
2010/0012446 A1* 1/2010 Ollat ..................... B60T 13/588 188/173
2010/0155096 A1 6/2010 Morrison
2010/0213235 A1* 8/2010 Pedicini .................. B25C 1/047 227/130
2011/0180582 A1* 7/2011 Cordeiro ................... B25C 1/08 227/9
2012/0090850 A1* 4/2012 Botich .................. E21B 33/064 166/363
2012/0160889 A1 6/2012 Tanji
2012/0181319 A1* 7/2012 Iijima ................... B25B 21/023 227/8
2012/0227389 A1* 9/2012 Hinderks ................ F01L 1/146 60/317
2013/0320063 A1 12/2013 Gregory et al.
2013/0320064 A1 12/2013 Gregory et al.
2014/0034700 A1 2/2014 Chang
2014/0087631 A1* 3/2014 Raghavan ............. B24C 7/0023 451/38
2014/0174839 A1* 6/2014 Steben ................... B62D 33/06 180/9.23
2014/0260231 A1* 9/2014 Burns ................... B05C 5/0237 60/413
2014/0361066 A1 12/2014 Liu et al.
2015/0102084 A1* 4/2015 Zhao ......................... B25C 1/08 227/10
2015/0196995 A1 7/2015 Neitzell
2015/0275849 A1* 10/2015 Sieber ..................... F03B 13/14 60/327
2015/0352702 A1* 12/2015 Chien ..................... B25C 1/047 227/130
2016/0096259 A1 4/2016 Pedicini
2016/0144497 A1* 5/2016 Boehm ................... B25C 1/143 227/2
2016/0229043 A1* 8/2016 Wyler ....................... B25C 1/06
2016/0288305 A1* 10/2016 McCardle ................. B25C 1/06
2016/0325420 A1 11/2016 Krout et al.
2016/0333542 A1* 11/2016 Jinnings .................... E02D 7/10
2017/0016555 A1* 1/2017 Franconi ............. F16K 31/1225
2017/0036333 A1 2/2017 Lin
2017/0036334 A1 2/2017 Baskar et al.
2017/0036335 A1* 2/2017 Largo ...................... B25C 1/008
2017/0049452 A1 2/2017 Milliman
2017/0066116 A1 3/2017 Garber et al.
2017/0100829 A1 4/2017 Pedicini et al.
2017/0175696 A1* 6/2017 Florijancic ............ F02N 11/087
2017/0190037 A1 7/2017 Sato et al.
2017/0217004 A1 8/2017 Kato
2017/0254204 A1 9/2017 Mina et al.
2017/0266796 A1 9/2017 Leimbach et al.
2017/0274513 A1 9/2017 Pedicini et al.
2018/0001455 A1* 1/2018 Meyer ....................... B25C 1/06
2018/0001461 A1 1/2018 Pedicini et al.
2018/0022049 A1* 1/2018 Montgomery ......... B29D 30/24 156/420
2018/0036870 A1 2/2018 Komazaki et al.
2018/0071904 A1 3/2018 Gregory et al.
2018/0085904 A1 3/2018 Gregory et al.
2018/0126527 A1 5/2018 Pomeroy et al.
2018/0126528 A1* 5/2018 Pomeroy ................... B25C 5/13
2018/0126530 A1 5/2018 Pomeroy et al.
2018/0152076 A1* 5/2018 Alei ......................... H02K 5/24
2018/0154505 A1 6/2018 Sato et al.
2018/0169846 A1* 6/2018 Fan ........................... B25C 1/08
2018/0178361 A1 6/2018 Kabbes et al.
2018/0193990 A1* 7/2018 Zhao ......................... B25C 1/08
2018/0290279 A1 10/2018 Kobori et al.
2018/0339404 A1* 11/2018 Zhao ......................... B25C 1/08
2019/0091845 A1 3/2019 Wyler et al.
2019/0126453 A1 5/2019 Po
2019/0168366 A1* 6/2019 Yasutomi ................ B25C 1/008
2019/0201597 A1* 7/2019 Shelton, IV ........ A61M 1/0056
2019/0224833 A1* 7/2019 Watanabe ................. B25C 1/08
2019/0366527 A1* 12/2019 Akiba ....................... B25C 7/00
2019/0381643 A1* 12/2019 Fan ......................... B25C 1/047
2020/0030953 A1 1/2020 Tan et al.
2020/0114500 A1* 4/2020 Bierdeman ............... B25C 1/06
2020/0282534 A1 9/2020 Po
2021/0205969 A1 7/2021 Zhu
2021/0291335 A1 9/2021 Liu et al.
2021/0316433 A1 10/2021 Ueda et al.
2021/0347023 A1 11/2021 Carrier et al.
2022/0250222 A1 8/2022 Garces et al.

FOREIGN PATENT DOCUMENTS

CN 102689289 B 9/2012
CN 202702169 U 1/2013
CN 103707264 B 4/2014
CN 203863632 U 10/2014
CN 204136014 U 2/2015
CN 105818099 A 8/2016
CN 205835215 U 12/2016
CN 106457539 A 2/2017
CN 107020674 A 8/2017
CN 107249823 A 10/2017
CN 107614206 A 1/2018
CN 107708934 A 2/2018
CN 108058137 A 5/2018
CN 108058142 A 5/2018
CN 108068059 A 5/2018
CN 208289826 U 12/2018
DE 1403600 A1 7/1959
DE 6915710 U 9/1969
DE 2510858 C2 9/1976
DE 8711784 U1 11/1987
DE 112018002619 T5 * 5/2020 ................ B25F 5/00
EP 147601 A1 7/1985
EP 1813394 A2 * 8/2007 ............... B25C 1/08
EP 2080593 B1 7/2009
EP 2209593 B1 7/2010
EP 2243600 B1 10/2010
EP 3253534 A1 12/2017
EP 3263286 A1 1/2018
EP 3277465 A1 2/2018
EP 3308907 A1 4/2018
EP 3321036 A1 5/2018
EP 3321037 A1 5/2018
EP 3326757 A2 5/2018
JP H0617882 U 3/1994
JP 2004074297 A * 3/2004 ............... B25C 1/08
JP 2006017882 U 1/2006
WO WO 08149902 A1 12/2008
WO WO 2009046076 A1 4/2009
WO WO 2016127101 A1 8/2016
WO WO 16046188 A1 9/2016
WO WO 2016136632 A1 9/2016
WO 2016158130 A1 10/2016
WO WO 2016160699 A1 10/2016
WO WO 16190133 A1 12/2016
WO WO 16199670 A1 12/2016
WO WO 2016199670 A1 12/2016
WO WO 17056810 A1 4/2017

(56) References Cited

FOREIGN PATENT DOCUMENTS

| | | |
|---|---|---|
| WO | WO 17061425 A1 | 4/2017 |
| WO | WO 18061556 A1 | 4/2018 |

OTHER PUBLICATIONS

International Search Report and Written Opinion for International Application No. PCT/US2020/063204 dated May 3, 2021 (13 pages).
Partial European Search Report for Application No. 25201169.7 dated Dec. 12, 2025 (13 pages).

* cited by examiner

GAS SPRING-POWERED FASTENER DRIVER

CROSS-REFERENCE TO RELATED APPLICATIONS

This application claims priority to U.S. Provisional Patent Application No. 62/683,460 filed on Jun. 11, 2018, the entire contents of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a gas spring-powered fastener driver including an outer cylinder, an inner cylinder positioned within the outer cylinder, and a moveable piston positioned within the inner cylinder. The gas spring-powered fastener driver further includes a driver blade attached to the piston and movable therewith between a top-dead-center (TDC) position and a driven or bottom-dead-center (BDC) position. A lifter is operable to move the driver blade from the BDC position toward the TDC position, and a transmission is for providing torque to the lifter. The outer cylinder and the inner cylinder define a first total volume in which gas is located when the driver blade is in the TDC position. The outer cylinder and the inner cylinder define a second total volume, which is greater than the first total volume, in which gas is located when the driver blade is in the BDC position. A compression ratio of the second total volume to the first total volume is 1.7:1 or less. And, a force acting on the driver blade when located in the TDC position is at least 90 pound-force (lbf) but no more than 450 pound-force (lbf).

The present invention provides, in another aspect, a gas spring-powered fastener driver including a cylinder, a moveable piston positioned within the cylinder, and a driver blade attached to the piston and movable therewith between a ready position and a driven position. A lifter is operable to move the driver blade from the driven position toward the ready position, and a transmission is for providing torque to the lifter. The gas spring-powered fastener driver further includes a latch assembly movable between a latched state in which the driver blade is held in the ready position against a biasing force of compressed gas, and a released state in which the driver blade is permitted to be driven by the biasing force toward the driven position. The latch assembly includes a latch, and a solenoid for moving the latch out of engagement with the driver blade when transitioning from the latched state to the released state. The solenoid defines a solenoid axis that is positioned parallel to a driving axis defined by the driver blade.

The present invention provides, in yet another aspect, a gas spring-powered fastener driver including a cylinder, a moveable piston positioned within the cylinder, and a driver blade attached to the piston and movable therewith between a ready position and a driven position. A lifter is operable to move the driver blade from the driven position toward the ready position, and a transmission is for providing torque to the lifter. The gas spring-powered fastener driver further includes a bumper positioned in the cylinder and configured to absorb impact energy from the piston when the driver blade is driven toward the driven position, and phase change material positioned proximate and in thermal contact with the bumper. The phase change material absorbs heat from the bumper during operation of the fastener driver.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
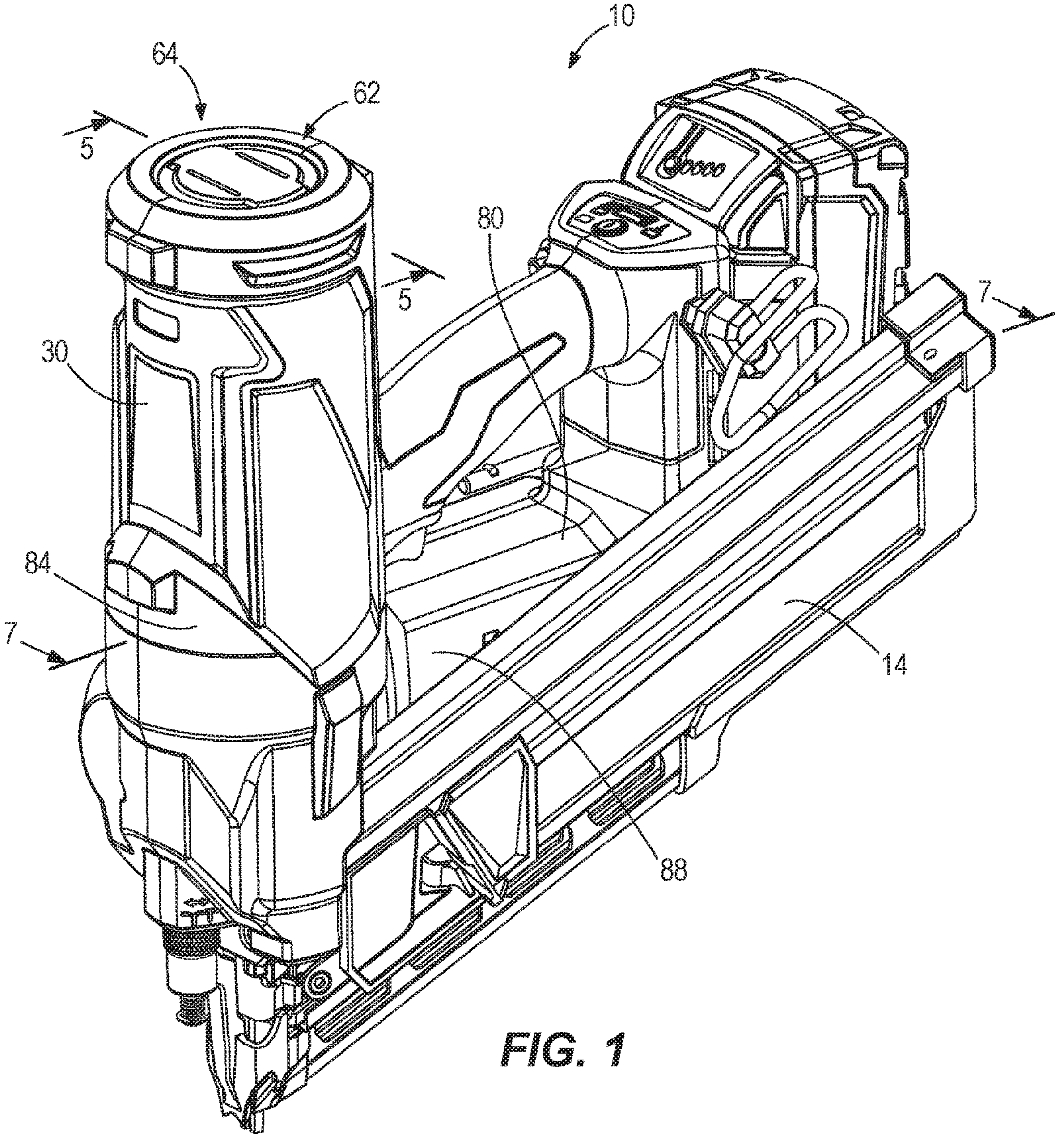
FIG. 1 is perspective view of a gas spring-powered fastener driver in accordance with an embodiment of the invention.
Figure 2:
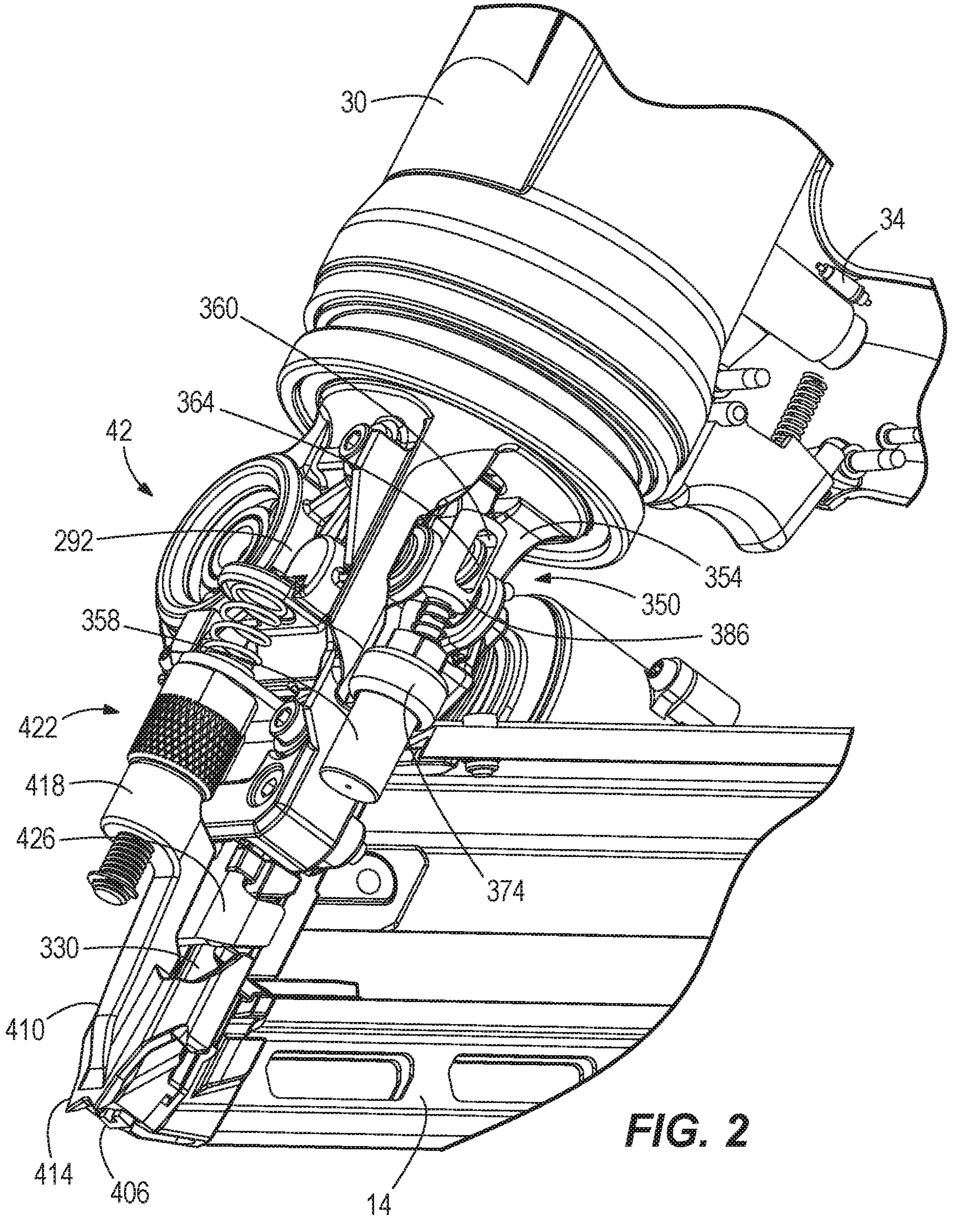
FIG. 2 is a partial cut-away view of the gas spring-powered fastener driver of FIG. 1.

With reference to FIGS. 1-4, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIG. 5). With reference to FIG. 5, the fastener driver 10 further includes a driver blade 26 that is attached to the piston 22 and moveable therewith. The fastener driver 10 does not require an external source of air pressure, but rather includes an outer storage chamber cylinder 30 (i.e., the “outer cylinder” in the claims) of pressurized gas in fluid communication with the cylinder 18. In the illustrated embodiment, the cylinder 18 and moveable piston 22 are positioned within the storage chamber cylinder 30. With reference to FIG. 2, the driver 10 further includes a fill valve 34 (shown exploded from the cylinder 30) coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

Figure 4:
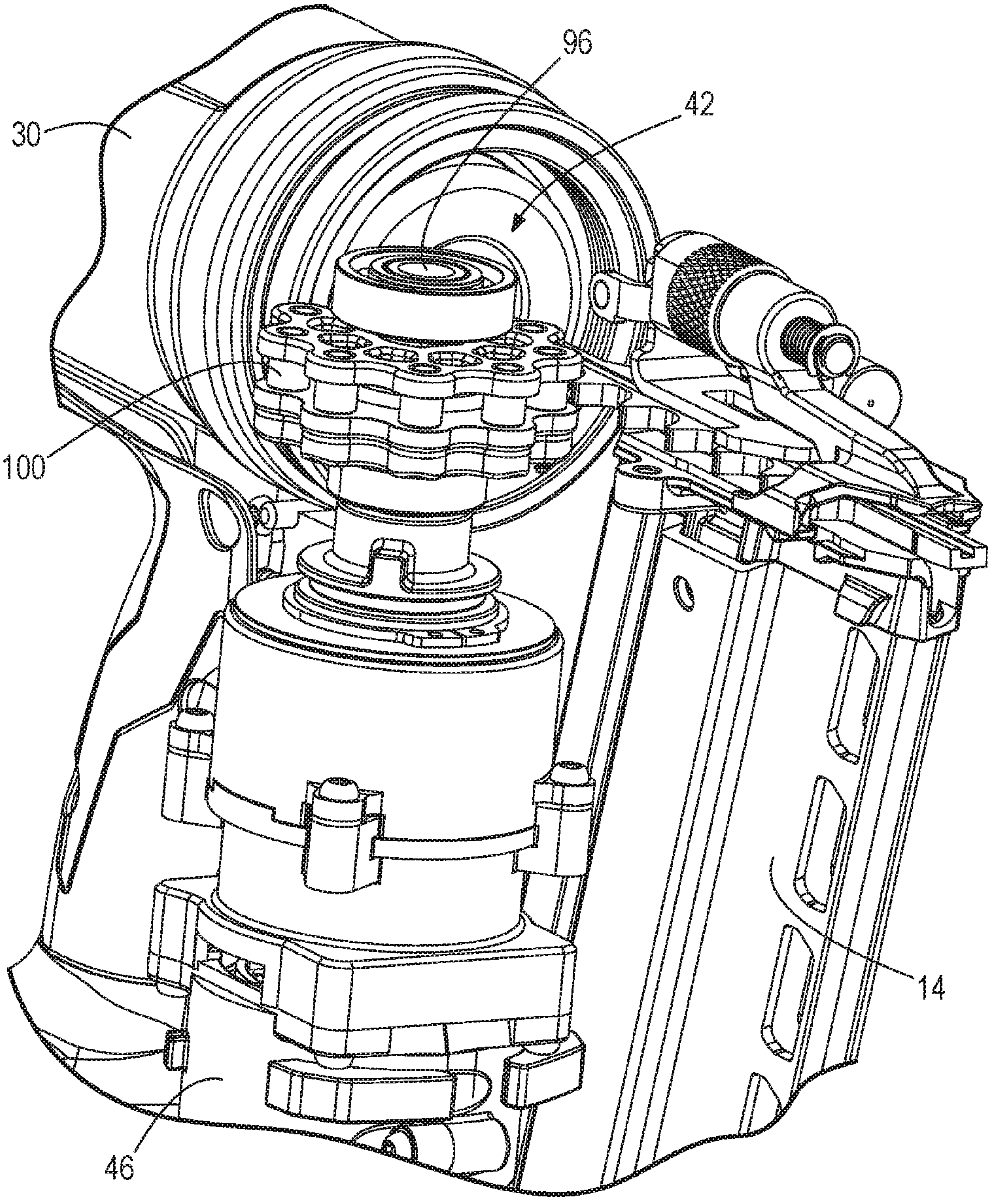
FIG. 4 is another partial cut-away view of the gas spring-powered fastener driver of FIG. 1, with portions removed for clarity.
Figure 5:
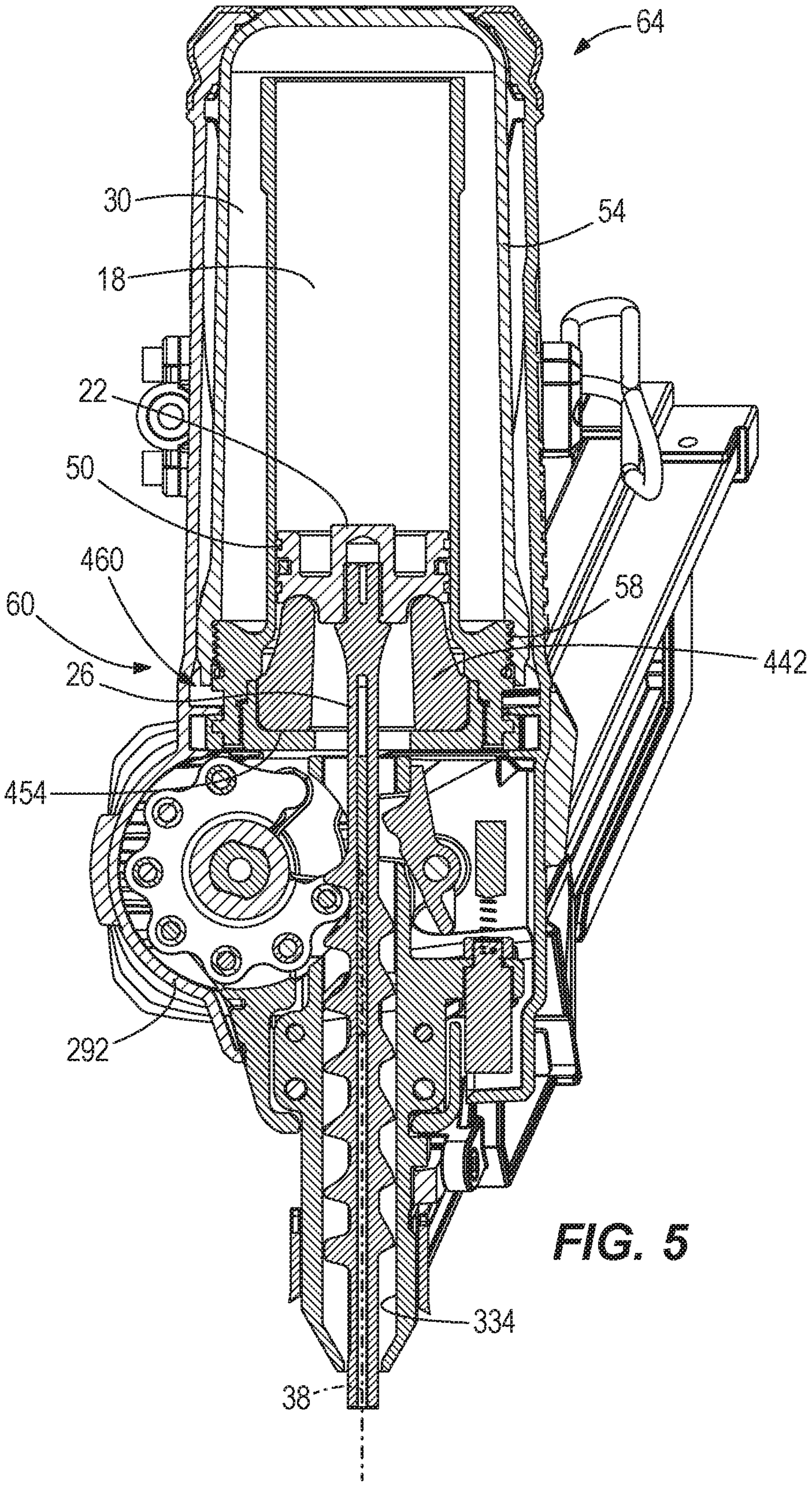
FIG. 5 is a partial cross-sectional view of the gas spring-powered fastener driver taken along line 5-5 in FIG. 1.
Figure 6A:
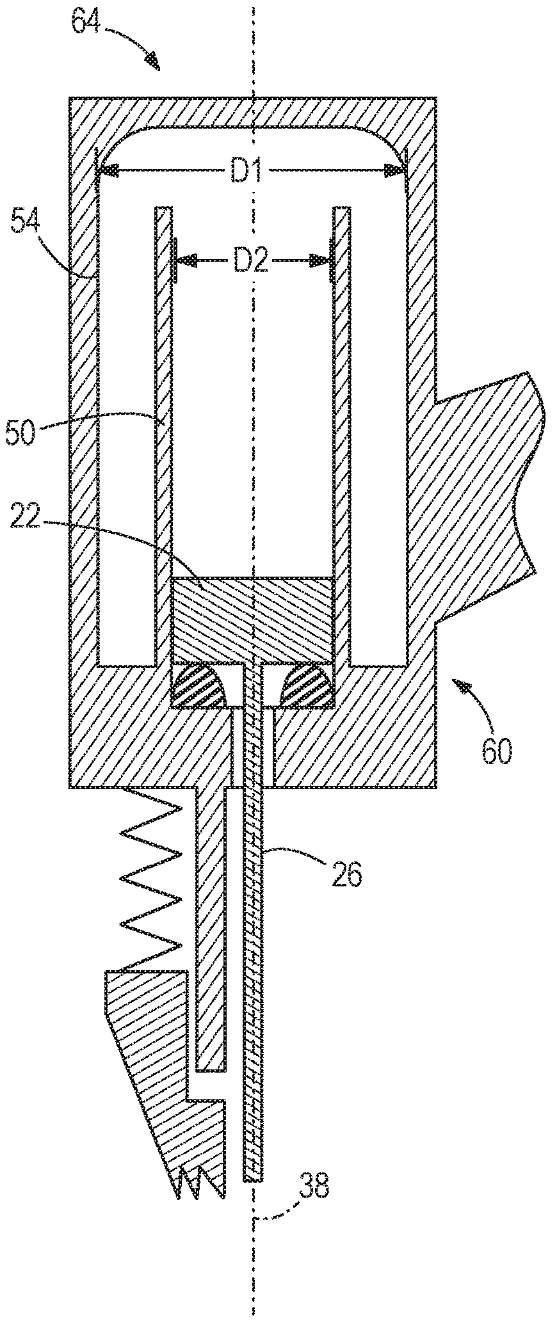
FIG. 6A is a schematic view of the gas spring-powered fastener driver of FIG. 1, illustrating a driver blade in a driven or bottom-dead-center position.
Figure 6B:
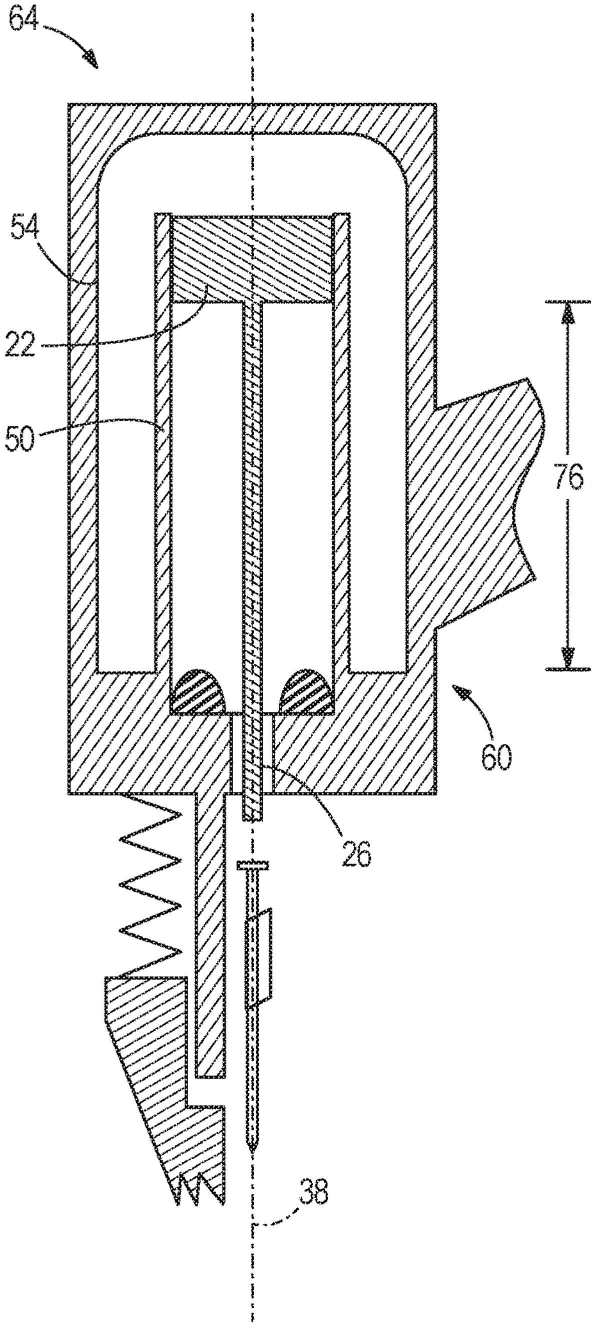
FIG. 6B is a schematic view of the gas spring-powered fastener driver of FIG. 1, illustrating a driver blade in a top-dead-center position prior to actuation.

With reference to FIGS. 4-6, the cylinder 18 and the driver blade 26 define a driving axis 38 (FIG. 5). During a driving cycle, the driver blade 26 and piston 22 are moveable between a top-dead-center (TDC) position (FIG. 6B) and a driven or bottom-dead-center (BDC) position (FIG. 6A). The fastener driver 10 further includes a lifting assembly 42 (FIG. 4), which is powered by a motor 46 (FIG. 4), and which is operable to move the driver blade 26 from the driven position to the TDC position.

Figure 3:
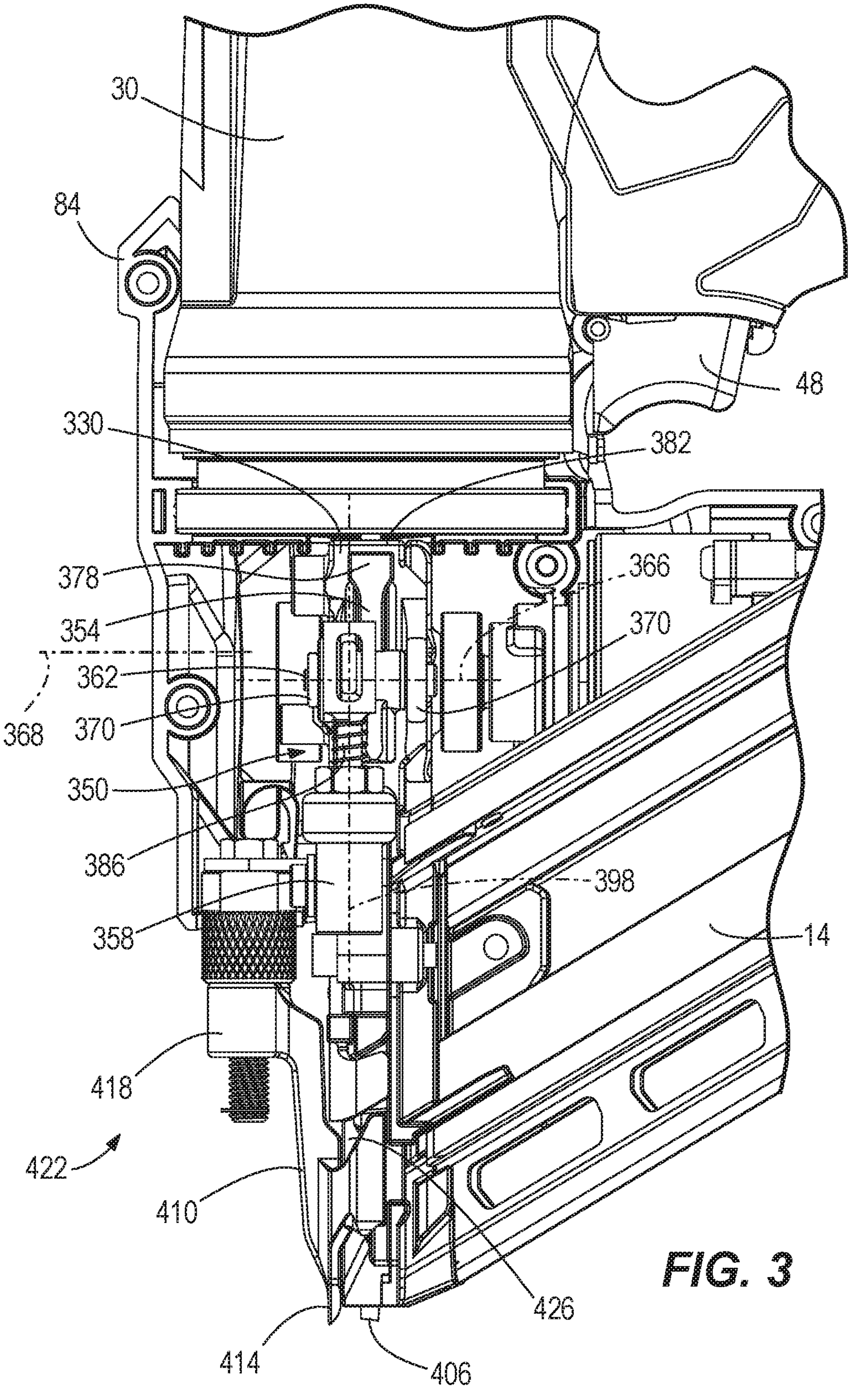
FIG. 3 is a partial cut-away view of the gas spring-powered fastener driver of FIG. 1, with portions removed for clarity.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC or driven positions, until being released by user activation of a trigger 48 (FIG. 3). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

With reference to FIGS. 5 and 6A-6B, the storage chamber cylinder 30 is concentric with the cylinder 18. The cylinder 18 has an annular inner wall 50 configured to guide the piston 22 and driver blade 26 along the driving axis 38 to compress the gas in the storage chamber cylinder 30. The storage chamber cylinder 30 has an annular outer wall 54 circumferentially surrounding the inner wall 50. The cylinder 18 has a threaded section 58 (FIG. 5). The storage chamber cylinder 30 has corresponding threads at a lower end 60 of the storage chamber cylinder 30 such that the cylinder 18 is threadably coupled to the storage chamber cylinder 30 at the lower end 60. As such, the cylinder 18 is configured to be axially secured to the storage chamber cylinder 30. The threaded coupling may facilitate and simplify assembly of the driver 10. Furthermore, the storage chamber cylinder 30 is rotatably movable relative to the cylinder 18 such that an indicia region 62 (FIG. 1) such as logos, images, brands, text, marks, and other indicia being displayed on a top end 64 of the storage chamber cylinder 30 can be aligned about the driving axis 38.

The storage chamber cylinder 30 and the cylinder 18 define a first total volume in which gas is located when the driver blade 26 is in the TDC position (FIG. 6B). The storage chamber cylinder 30 and the cylinder 18 define a second total volume, which is greater than the first total volume, in which gas is located when the driver blade 26 is in the driven position (FIG. 6A). A compression ratio is defined as the ratio of the second total volume to the first total volume. In one embodiment, the compression ratio is 1.7:1 or less. For example, in the illustrated embodiment, the compression ratio is 1.61:1. In another embodiment, the compression ratio is 1.6:1 or less. A lower compression ratio may reduce the force and/or stress on the driver 10 (i.e., the storage chamber cylinder 30, piston 22) which may prolong the useful life of the driver 10. In particular, when the piston 22 and the driver blade 26 is moved toward the TDC position, forces (from the lifting assembly 42 and the gas being compressed in the cylinder 18 and the storage chamber cylinder 30 by the piston 22) act on the driver blade 26. The forces are at a maximum as the piston 22 and the driver blade 26 reach the TDC position. As such, a lower compression ratio reduces the reaction force imparted by the lifting assembly 42 and/or stress on the driver blade 26 when located in the TDC position, thereby reducing wear on the driver blade 26 and prolonging the life of the driver 10.

In one embodiment, a force acting on the driver blade 26 when located in the TDC position is no more than 450 pound-force (lbf). In another embodiment, the force acting on the driver blade 26 when located in the TDC position is no more than 435 lbf. In yet another embodiment, the force acting on the driver blade 26 when located in the TDC position is about 433 lbf. In some embodiments, in addition to applying a maximum force of 450 lbf or less on the driver blade 26 when located in the TDC position, a minimum force of 85 lbf must be applied to the driver blade 26 when located in the TDC position. Similarly, a lower compression ratio may reduce force and/or stress on the driver blade 26 when located in the ready position. In one embodiment, a force acting on the driver blade 26 when located in the ready position is no more than 430 pound-force (lbf). In another embodiment, the force acting on the driver blade 26 when located in the ready position is no more than 415 lbf. In yet another embodiment, the force acting on the driver blade 26 when located in the ready position is about 410 lbf.

Although in some embodiments it is desirable to maintain the force acting on the driver blade 26 when located in the TDC position to be no more than 450 lbf, it is also desirable to maintain a relatively high average force on the driver blade 26 between its TDC and BDC positions to sufficiently drive fasteners into a workpiece. For example, in one embodiment, the average force on the driver blade 26 is between 302 lbf and 362 lbf, and the force acting on the driver blade 26 when located in the driven or BDC position is no less than 225 lbf. In another embodiment, the average force acting on the driver blade 26 is between 327 lbf and 337 lbf, and the force acting on the driver blade 26 when located in the driven or BDC position is no less than 250 lbf. In yet another embodiment, the average force on the driver blade 26 is about 332 lbf, and the force acting on the driver blade 26 when located in the driven or BDC position is about 252 lbf.

A stroke length 76 (FIG. 6B) of the piston 22/driver blade 26 is defined as the distance travelled by the piston 22/driver blade 26 between the TDC and driven positions (FIGS. 6B and 6A respectively). The stroke length 76 determines the applied pressure on the piston 22 when the piston 22 is at the TDC position. In the illustrated embodiment, the stroke length 76 is between 4.1 inches and 5.1 inches. In another embodiment, the stroke length 76 is between 4.4 inches and 4.8 inches. In yet another embodiment, the stroke length 76 is about 4.6 inches.

With reference to FIG. 6A, the storage chamber cylinder 30 has a first diameter D1. The cylinder 18 has a second diameter D2 that is less than the first diameter D1 of the storage chamber cylinder 30. In one embodiment, the second diameter D2 is about 1.732 inches. In conjunction with a stroke length 76 of the piston 22 of about 4.6 inches, the volume displaced by the piston 22 between the TDC and BDC positions of the driver blade 26 is about 10.8 cubic inches.

With the abovementioned ranges of stroke length 76 and the abovementioned ranges of average force applied to the driver blade 26 as it moves between its TDC and BDC positions, in some embodiments, the fastener driver 10 is capable of performing up to 120 Joules (J) of work upon a fastener during a fastener driving operation. Such impact energy is sufficient to drive nails of up to 3.5 inches in length into a workpiece during, for example, a framing operation. Furthermore, in some embodiments, the fastener driver 10 is capable of performing at least 15 J of work upon a fastener during a fastener driving operation.

A pressure of the storage chamber cylinder 30 changes based on the position of the driver blade 26 and the piston 22. For example, when the compression ratio is about 1.61:1 and the stroke length 76 is about 4.6 inches, the pressure of the storage chamber cylinder 30 is about 108 pounds per square inch (psi) when the piston 22/driver blade 26 are at the driven position and 174 psi when the piston 22/driver blade 26 are at the TDC position (i.e., when the gas in the storage chamber cylinder 30 is at 70 degrees Fahrenheit). In other embodiments, the pressure of the storage chamber cylinder 30 is between 98 psi and 118 psi when the piston 22/driver blade 26 are at the driven position, and between 164 psi and 184 psi when the piston 22/driver blade 26 are at the TDC position (i.e., when the gas in the storage chamber cylinder 30 is at 70 degrees Fahrenheit).

Figure 7:
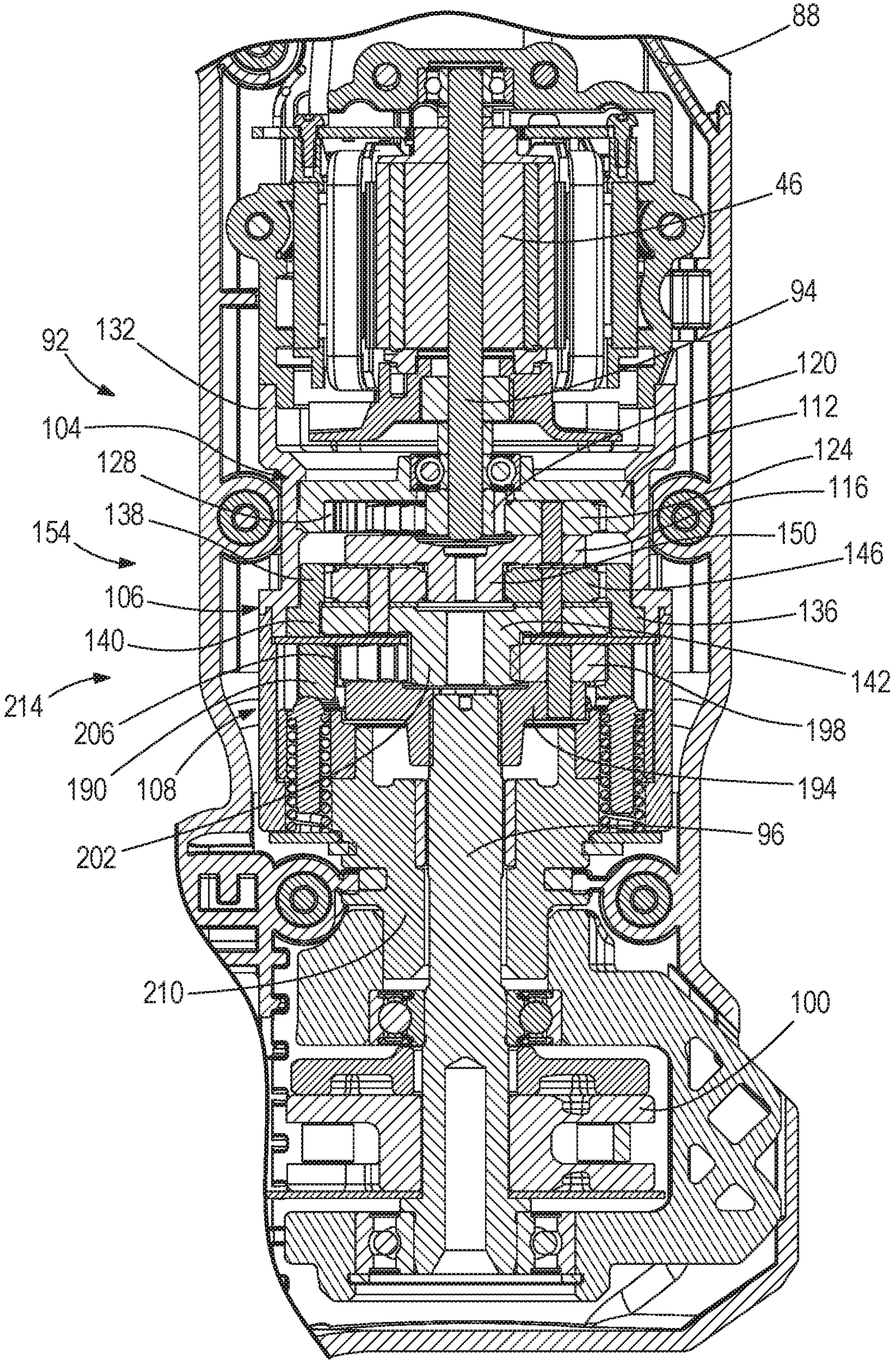
FIG. 7 is a cross-sectional view of the gas spring-powered fastener driver of FIG. 1 taken along line 7-7 in FIG. 1, illustrating a motor and a transmission for providing torque to a lifter.

With reference to FIG. 1, the driver 10 includes a housing 80 having a cylinder support portion 84 in which the storage chamber cylinder 30 is at least partially positioned and a motor support portion 88 in which the motor 46 and a transmission 92 are at least partially positioned. In the illustrated embodiment, the cylinder support portion 84 is integrally formed with the motor support portion 88 as a single piece (e.g., using a casting or molding process, depending on the material used). As described below in further detail, the transmission 92 which raises the driver blade 26 from the driven position to the ready position. With reference to FIG. 7, the motor 46 is positioned within the transmission housing portion 88 for providing torque to the transmission 92 when activated. A battery (not shown) is electrically connectable to the motor 46 for supplying electrical power to the motor 46. In alternative embodiments, the driver may be powered from an AC voltage input (i.e., from a wall outlet), or by an alternative DC voltage input (e.g., an AC/DC converter).

With reference to FIG. 7, the transmission 92 includes an input 94 (i.e., a motor output shaft) and includes an output shaft 96 extending to a lifter 100, which is operable to move the driver blade 26 from the driven position to the ready position, as explained in greater detail below. In other words, the transmission 92 provides torque to the lifter 100 from the motor 46. The transmission 92 is configured as a planetary transmission having first, second, and third planetary stages 104, 106, 108. In alternative embodiments, the transmission may be a single-stage planetary transmission, or a multi-stage planetary transmission including any number of planetary stages.

With continued reference to FIG. 7, the first planetary stage 104 includes a ring gear 112, a carrier 116, a sun gear 120, and multiple planet gears 124 coupled to the carrier 116 for relative rotation therewith. The sun gear 120 is drivingly coupled to the motor output shaft 94 and is enmeshed with the planet gears 124. The ring gear 112 includes a toothed interior peripheral portion 128. In the illustrated embodiment, the ring gear 112 in the first planetary stage 104 is fixed to a transmission housing 132 positioned adjacent the motor 46 such that it is prevented from rotating relative to the transmission housing 132. The plurality of planet gears 124 are rotatably supported upon the carrier 116 and are engageable with (i.e., enmeshed with) the toothed interior peripheral portion 128.

The second planetary stage 106 includes a ring gear 136, a carrier 142, and multiple planet gears 146 coupled to the carrier 142 for relative rotation therewith. The ring gear 136 includes a first toothed interior peripheral portion 138, and a second interior peripheral portion 140 adjacent the toothed interior peripheral portion 138. The carrier 116 of the first planetary stage 104 further includes an output pinion 150 that is enmeshed with the planet gears 146 which, in turn, are rotatably supported upon the carrier 142 of the second planetary stage 106 and enmeshed with the toothed interior peripheral portion 138 of the ring gear 136. Similar to the ring gear 112 of the first planetary stage 104, the ring gear 136 of the second planetary stage 106 is fixed relative to the transmission housing 132.

Figure 8:
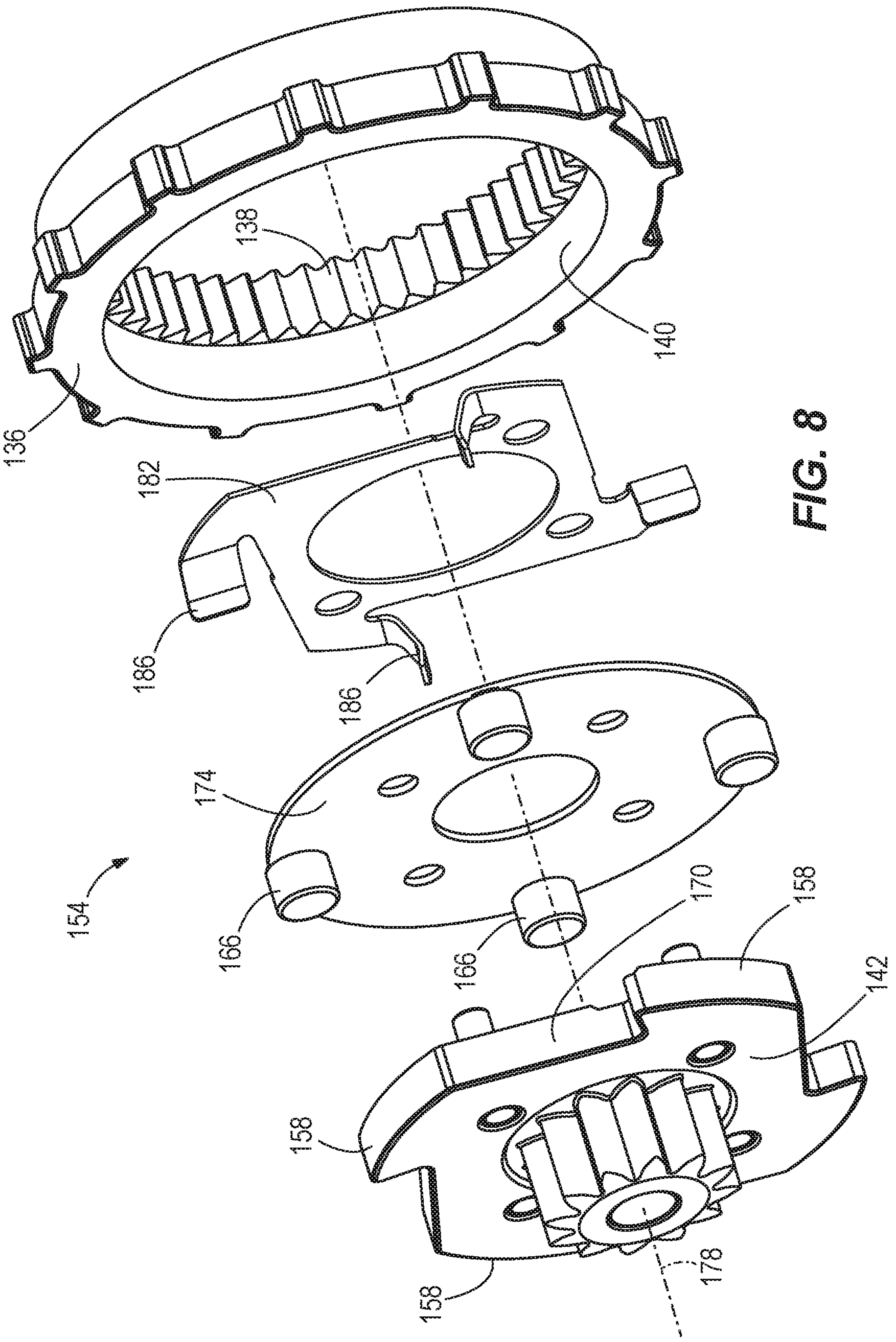
FIG. 8 is an exploded view of a one-way clutch mechanism of the transmission of FIG. 7.
Figure 9:
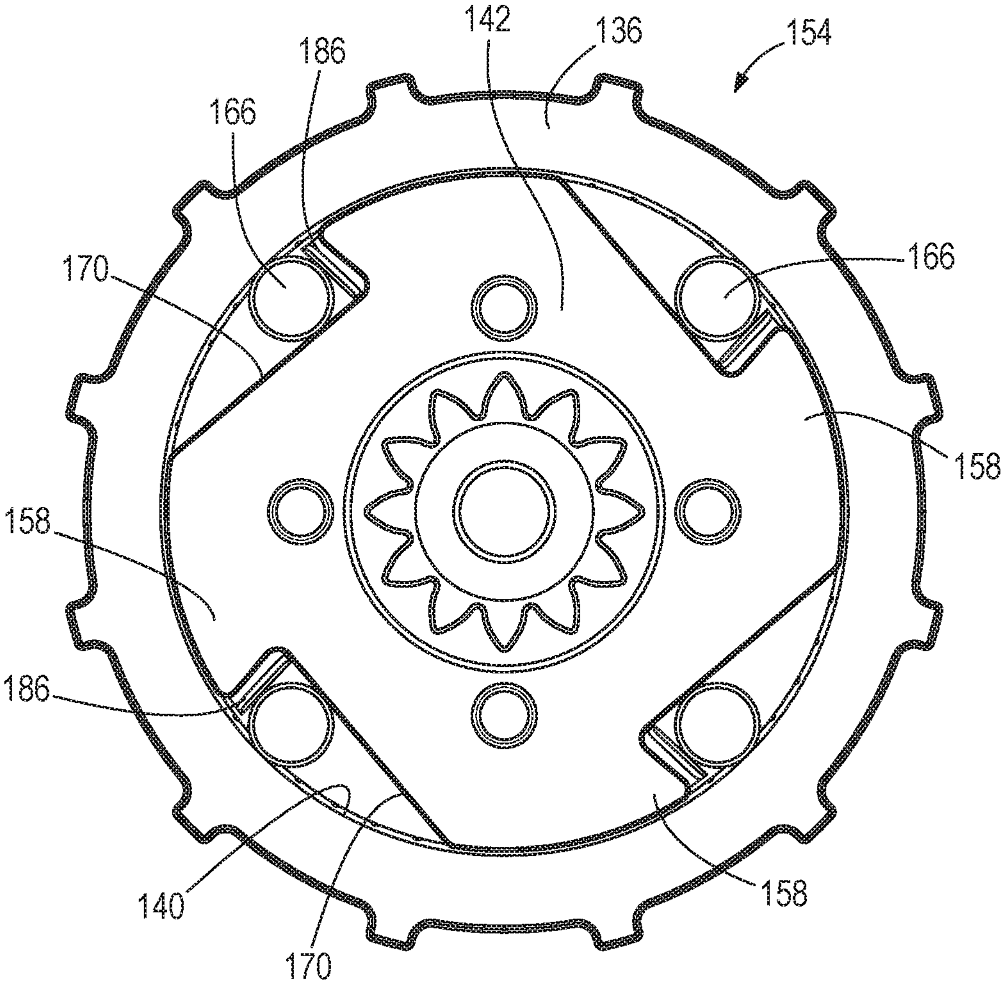
FIG. 9 is an assembled, cross-sectional view of the one-way clutch mechanism of FIG. 8.

With reference to FIGS. 7-9, the driver 10 further includes a one-way clutch mechanism 154 incorporated in the transmission 92. More specifically, the one-way clutch mechanism 154 includes the carrier 142, which is also a component in the third planetary stage 108. The one-way clutch mechanism 154 permits a transfer of torque to the output shaft 96 of the transmission 92 in a single (i.e., first) rotational direction (i.e., counter-clockwise from the frame of reference of FIG. 9), yet prevents the motor 46 from being driven in a reverse direction in response to an application of torque on the output shaft 96 of the transmission 92 in an opposite, second rotational direction (e.g., clockwise from the frame of reference of FIG. 9). In the illustrated embodiment, the one-way clutch mechanism 154 is incorporated with the second planetary stage 106 of the transmission 92. In alternative embodiments, the one-way clutch mechanism 154 may be incorporated into the first planetary stage 104, for example.

With continued references to FIGS. 7-9, the one-way clutch mechanism 154 also includes a plurality of lugs 158 (FIG. 8) defined on an outer periphery of the carrier 142. In addition, the one-way clutch mechanism 154 includes a plurality of rolling elements 166 engageable with the respective lugs 158, and a ramp 170 (FIG. 9) adjacent each of the lugs 158 along which the rolling element 166 is moveable. The illustrated rolling elements 166 extend from a disc 174. Each of the ramps 170 is inclined in a manner to displace the rolling elements 166 farther from a rotational axis 178 (FIG. 8) of the carrier 142 as the rolling elements 166 move further from the respective lugs 158. With reference to FIG. 7, the carrier 142 of the one-way clutch mechanism 154 is in the same planetary stage of the transmission 92 as the ring gear 136 (i.e., the second planetary stage 106). The rolling elements 166 are engageable with the second interior peripheral portion 140 of the ring gear 136 in response to an application of torque on the transmission output shaft 96 in the second rotational direction (i.e., as the rolling elements 166 move along the ramps 170 away from the respective lugs 158). A plate spring 182 is positioned adjacent the carrier 142. The plate spring 182 includes arms 186 for biasing the rolling elements 166 toward the second interior peripheral portion 140 (and away from the lugs 158).

In operation of the one-way clutch mechanism 154, the rolling elements 166 are maintained in close proximity with the respective lugs 158 in the first rotational direction (i.e., counter-clockwise from the frame of reference of FIG. 9) of the transmission output shaft 96. However, when the piston 22/driver blade 26 has reached the ready position, the rolling elements 166 move away from the respective lugs 158 in response to an application of torque on the transmission output shaft 96 in an opposite, second rotational direction (i.e., clockwise from the frame of reference of FIG. 9). More specifically, when the transmission output shaft 96 rotates a small amount (e.g., 1 degree) in the second rotational direction, the rolling elements 166 roll away from the respective lugs 158 along the ramps 170, and engage the second interior peripheral portion 140 on the ring gear 136 to thereby prevent further rotation of the transmission output shaft 96 in the second rotational direction. The corresponding arms 186 of the plate spring 182 exert an additional force on the roller elements 166 to maintain the rolling elements 166 against the second interior peripheral portion 140 of the ring gear 136, where they jam or wedge against the second interior peripheral portion 140. Consequently, the one-way clutch mechanism 154 prevents the transmission 92 from applying torque to the motor 46, which might otherwise back-drive or cause the motor 46 to rotate in a reverse direction, in response to an application of torque on the transmission output shaft 96 in an opposite, second rotational direction (i.e., when the piston 22 and the driver blade 26 has reached the ready position).

With reference to FIG. 7, the third planetary stage 108 includes a ring gear 190, a carrier 194, and multiple planet gears 198 coupled to the carrier 194 for relative rotation therewith. The carrier 142 of the second planetary stage 106 further includes an output pinion 202 that is enmeshed with the planet gears 198 which, in turn, are rotatably supported upon the carrier 194 of the third planetary stage 108 and enmeshed with a toothed interior peripheral portion 206 of the ring gear 190. Unlike the ring gears 112, 136 of the first and second planetary stages 104, 106, the ring gear 190 of the third planetary stage 108 is rotatable relative to a transmission cover 210 adjacent the transmission housing 132. The carrier 194 is coupled to the output shaft 96 for relative rotation therewith.

Figure 10:
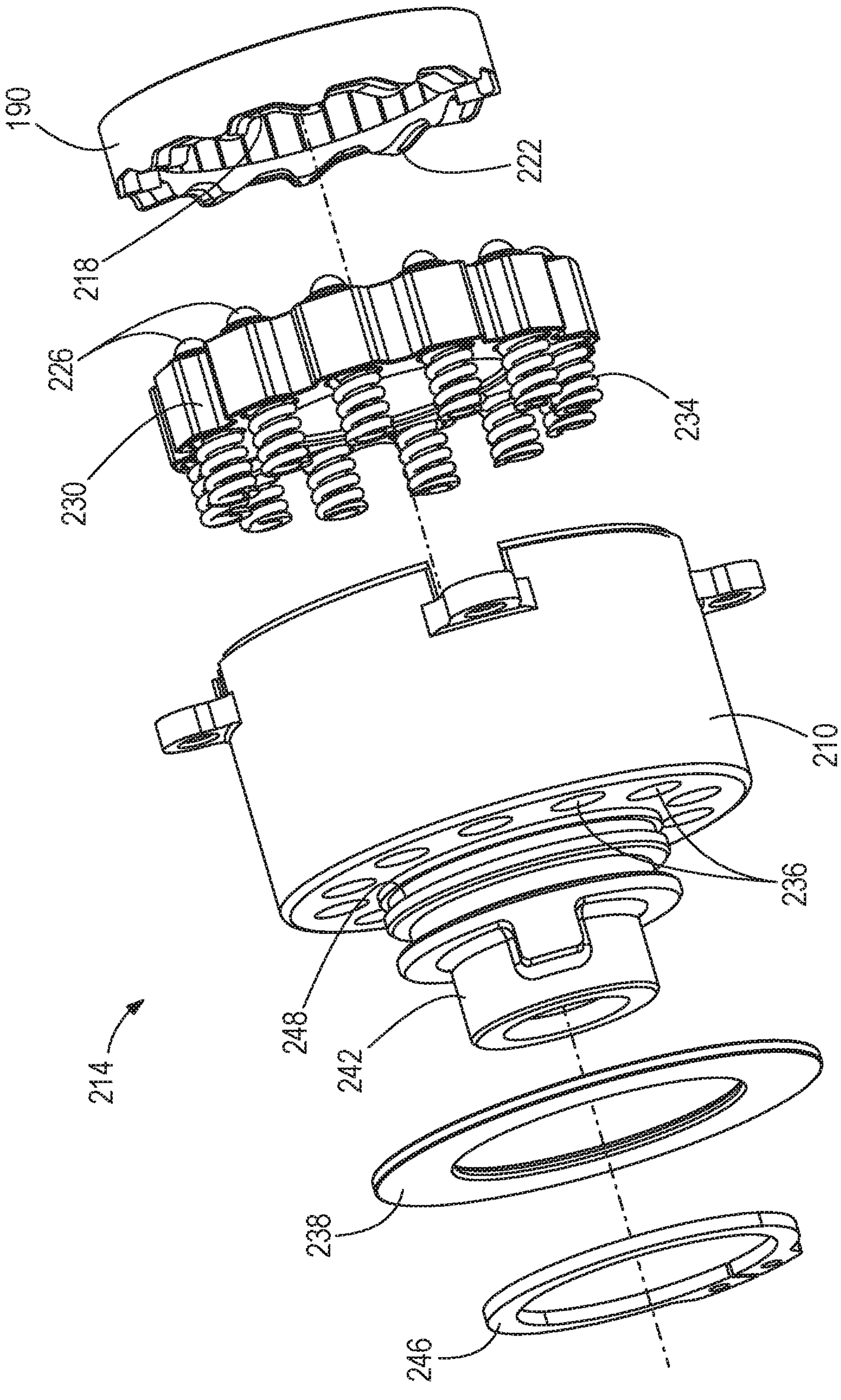
FIG. 10 is an exploded view of a torque-limiting clutch mechanism of the transmission of FIG. 7.
Figure 11:
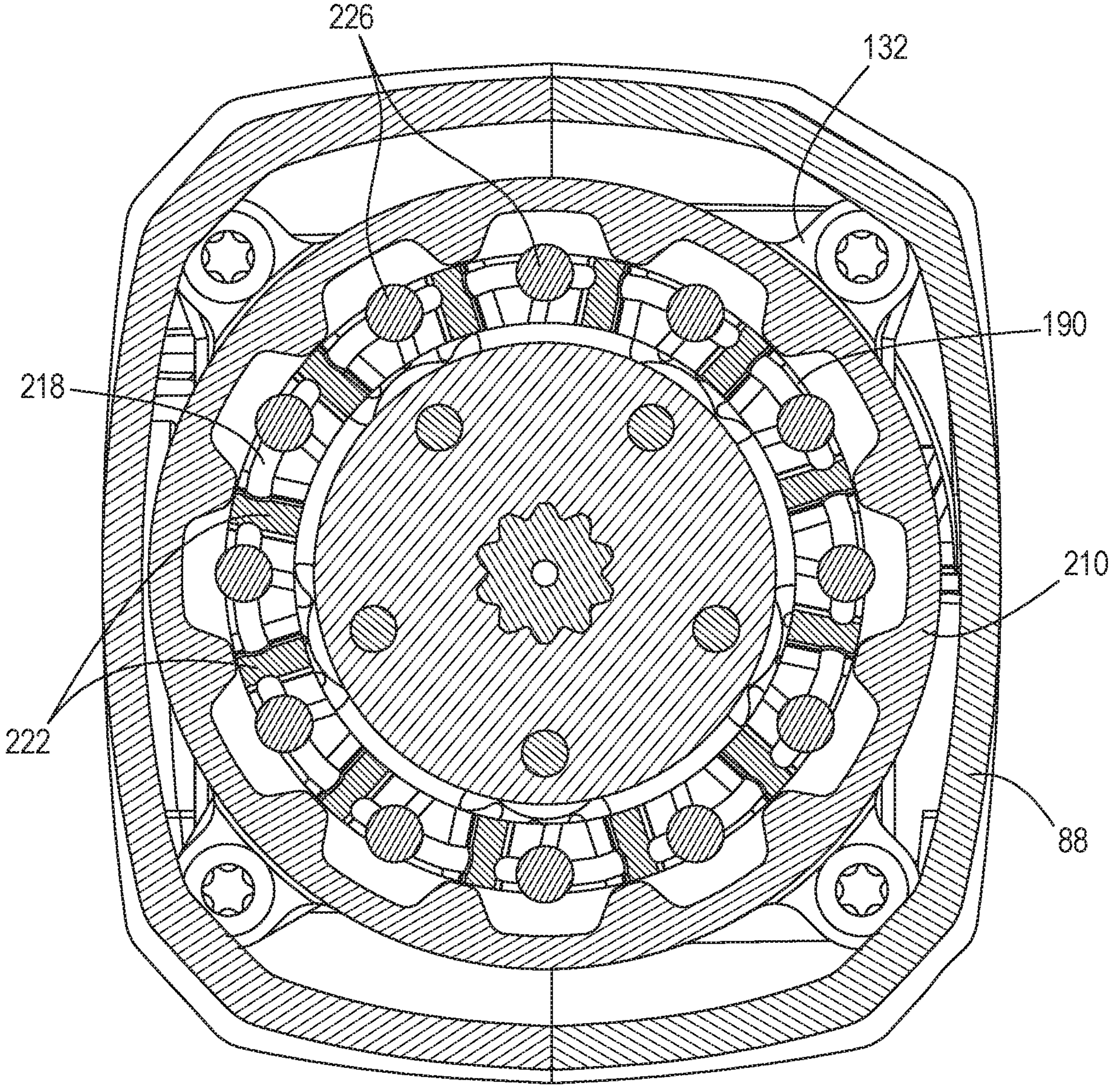
FIG. 11 is an assembled, partial cross-sectional view of the torque-limiting clutch mechanism of FIG. 10, with portions of the gas spring-powered fastener driver of FIG. 1 added for clarity.

With reference to FIGS. 7, 10, and 11, the driver 10 further includes a torque-limiting clutch mechanism 214 incorporated in the transmission 92. More specifically, the torque-limiting clutch mechanism 214 includes the ring gear 190, which is also a component of the third planetary stage 108. The torque-limiting clutch mechanism 214 limits an amount of torque transferred to the transmission output shaft 96 and the lifter 100. In the illustrated embodiment, the torque-limiting clutch mechanism 214 is incorporated with the third planetary stage 108 of the transmission 92 (i.e., the last of the planetary transmission stages), and the one-way and torque-limiting clutch mechanisms 154, 214 are coaxial (i.e., aligned with the rotational axis 178).

With references to FIGS. 10 and 11, the ring gear 190 of the torque-limiting clutch mechanism 214 includes an annular front end 218 having a plurality of lugs 222 defined thereon. The torque-limiting clutch mechanism 214 further includes a plurality of detent members 226 supported within a collar 230 fixed to the cover 210. The detent members 226 are engageable with the respective lugs 222 to inhibit rotation of the ring gear 190, and the torque-limiting clutch mechanism 214 further includes a plurality of springs 234 for biasing the detent members 226 toward the annular front end 218 of the ring gear 190. The springs 234 are seated within respective cylindrical pockets 236 in the cover 210 between the collar 230 and a disc 238. The disc 238 is positioned outside the cover 210 and circumferentially surrounds a section 242 of the cover 210. A retaining ring 246 axially secures the disc 238 to the cover 210. In response to a reaction torque applied to the transmission output shaft 96 that is above a predetermined threshold, torque from the motor 46 is diverted from the transmission output shaft 96 to the ring gear 190, causing the ring gear 190 to rotate and the detent members 226 to slide over the lugs 222.

With continued reference to FIGS. 7, 10, and 11, the gears (i.e., the first, second, and third planetary stages 104, 106, 108) may be assembled from the front of the transmission housing 132, and the torque-limiting clutch mechanism 214 may be inserted through a rear of the cover 210 adjacent the transmission housing 132. Then, the detent members 226 and the springs 234 may be inserted through the respective cylindrical pockets 236 at the front of the collar 230, and the disc 238 is positioned against the springs 234 for pre-loading the springs 234. Subsequently, the retaining ring 246 is positioned within a circumferential groove 248 in the cover section 242 and against the disc 238 to axially secure the disc 238. This may simplify assembly of the transmission 92, reduce required assembly time, and lower cost of parts.

Figure 12:
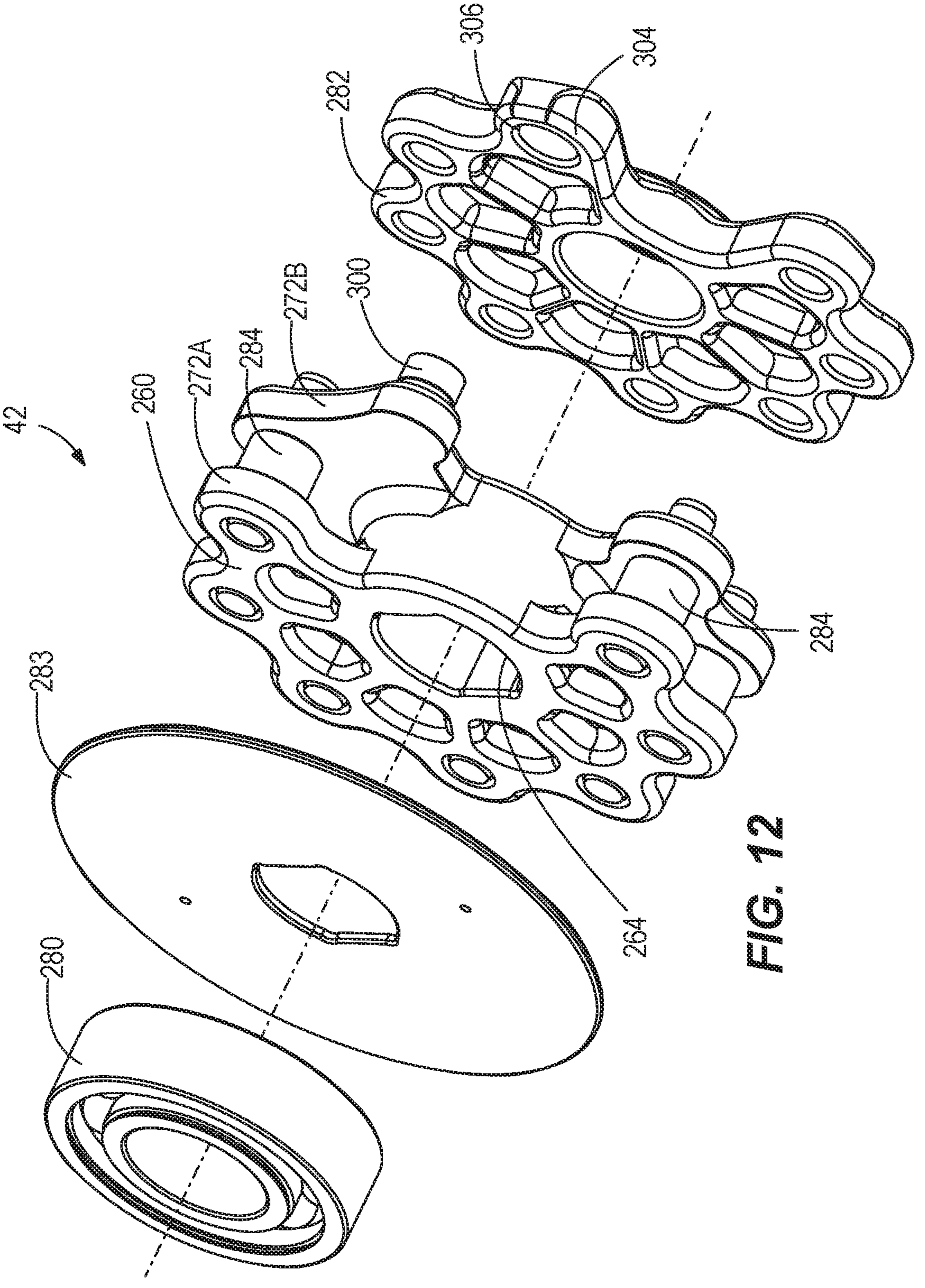
FIG. 12 is an exploded view of the lifter of FIG. 7.

With reference to FIGS. 4 and 12, the lifter 100, which is a component of the lifting assembly 42, is coupled for co-rotation with the transmission output shaft 96 which, in turn, is coupled for co-rotation with the third-stage carrier 194 by a spline-fit arrangement (FIG. 11). The lifter 100 includes a hub 260 having an opening 264. An end of the transmission output shaft 96 extends through the opening 264 and is rotatably secured to the lifter 100. With continued reference to FIG. 12, the hub 260 is formed by two plates 272A, 272B, and includes multiple drive pins 276 (FIG. 13) extending between the plates 272A, 272B. The illustrated lifter 100 includes seven drive pins 276; however, in other embodiments, the lifter 100 may include three or more drive pins 276. The drive pins 276 are sequentially engageable with the driver blade 26 to raise the driver blade 26 from the driven position to the ready position. The lifter assembly 42 further includes a bearing 280 positioned proximate the upper plate 272A. The bearing 280 is configured to rotatably support the transmission output shaft 96.

The illustrated lifter 100 further includes a disk member 282 positioned adjacent the lower plate 272B (FIG. 12). The disk member 282 is coupled for co-rotation with the transmission output shaft 96 and the lifter 100. The disk member 282 supports a magnet 300 positioned within a bore 306 defined by an outer peripheral portion 304 of the disk member 282, as further discussed below. Specifically, the disk member 282 may be considered a retaining member for inhibiting axial movement of the drive pins 276 and the magnet 300 relative to the rotational axis 178 (i.e., to the right from the frame of reference of FIG. 12). The lifter 100 further includes a second retaining member 283. The second retaining member 283 is positioned between the bearing 280 and a top surface of the upper plate 272A of the hub 260. More specifically, the second retaining member 283 is adjacent the top surface (i.e., positioned to the left from the frame of reference of FIG. 12). In the illustrated embodiment, the second retaining member 283 is a washer. In other embodiments, the second retaining member 283 may be a plate member, a disk member, etc. The second retaining member 283 is configured to inhibit axial movement of the drive pins 276 relative to the rotational axis 178 (i.e., to the left from the frame of reference of FIG. 12).

With reference to FIG. 12, the lifter 100 further includes roller bushings 284 positioned on each of the drive pins 276. The roller bushings 284 are configured to facilitate rolling motion between the driver pins 276 and the driver blade 26 when raising the driver blade 26 from the driven portion to the ready position. This may reduce wear on the driver blade 26 (i.e., teeth) and/or the lifter 100 which may increase the life of the driver 10.

Figure 13:
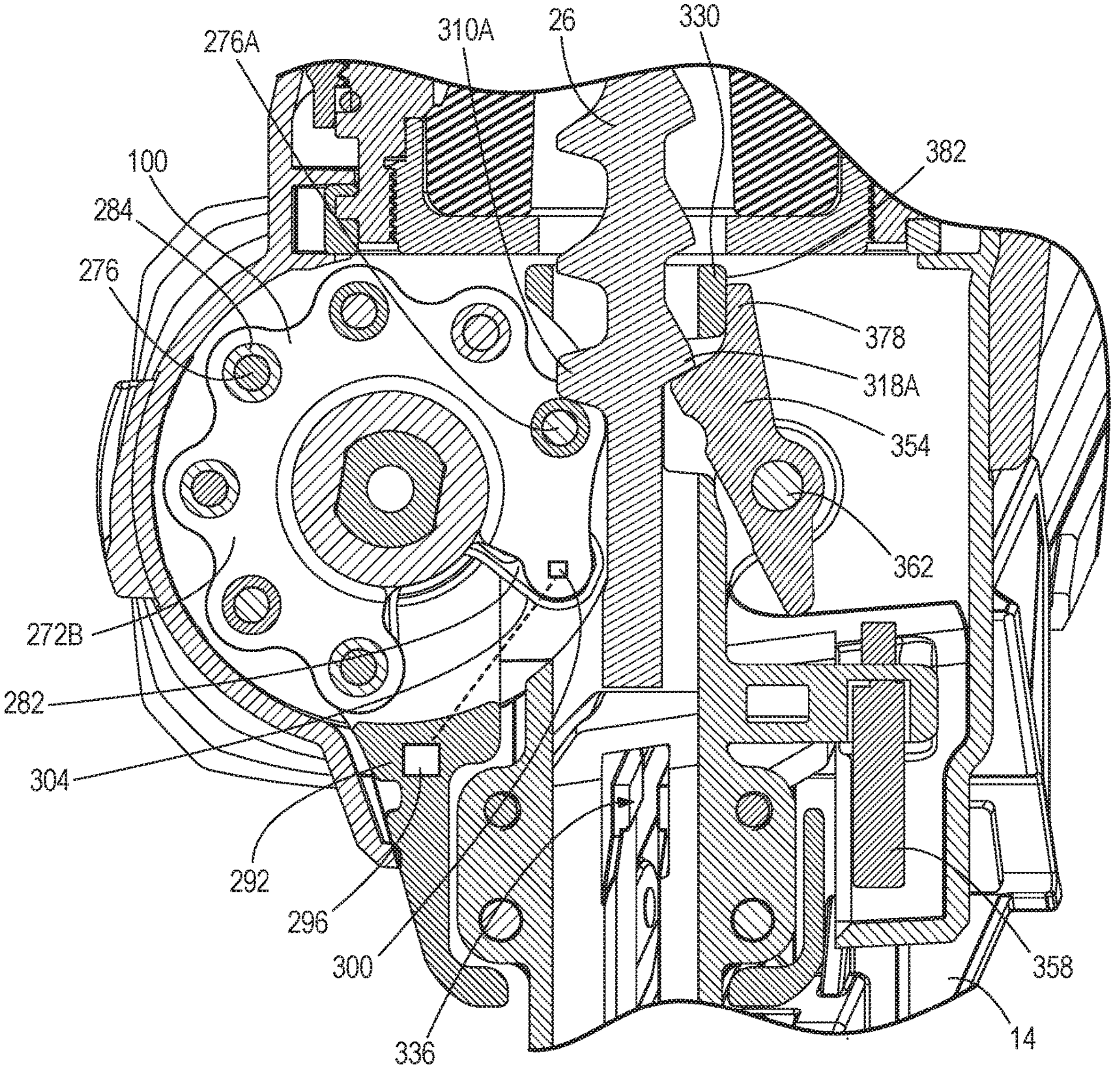
FIG. 13 is an enlarged view of the gas spring-powered fastener driver of FIG. 5, illustrating the driver blade in a ready position and a latch in a latched state.
Figure 14:
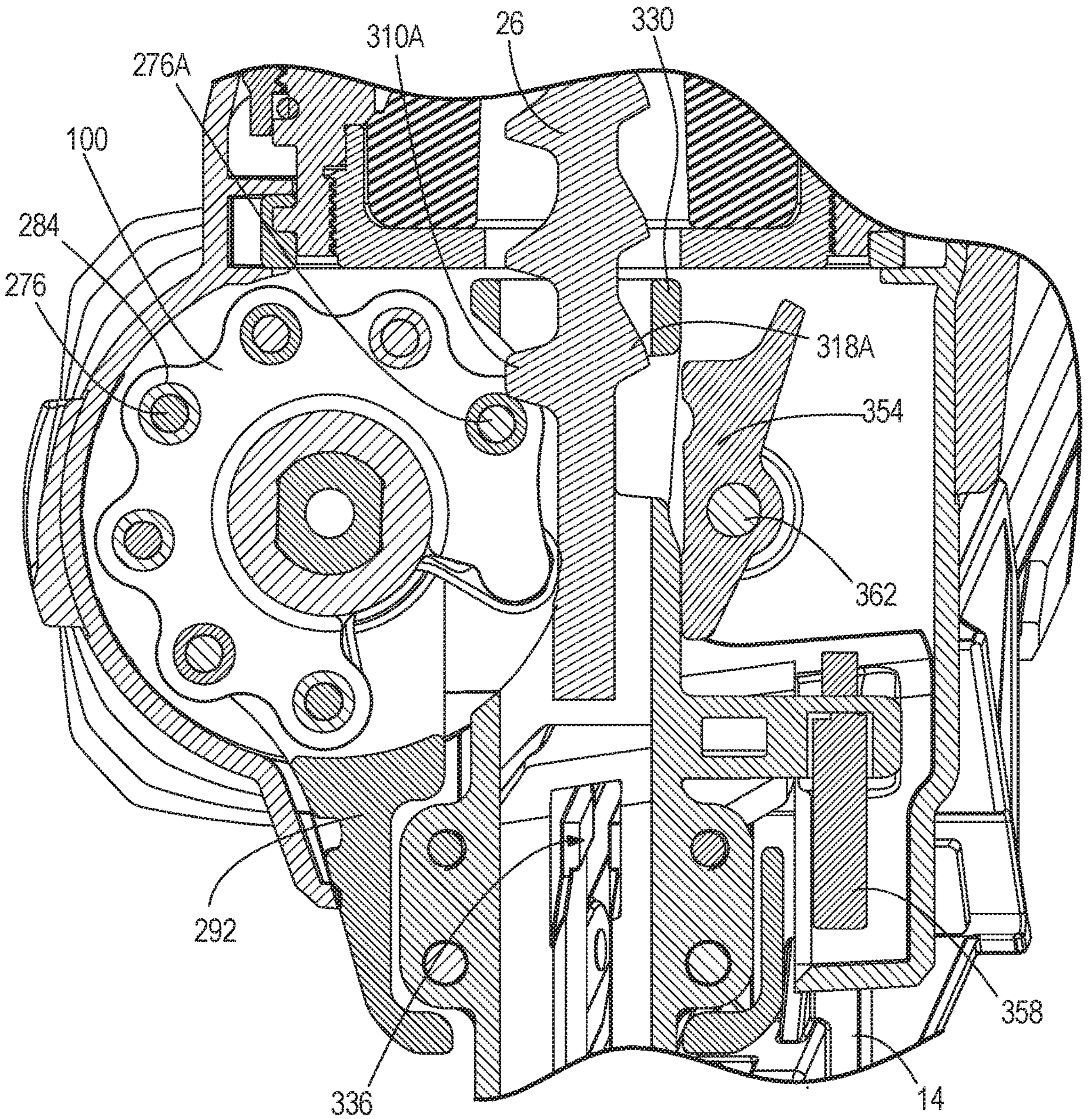
FIG. 14 is an enlarged view of the gas spring-powered fastener driver of FIG. 5, illustrating the driver blade in the top-dead-center position and the latch in a released state.

With reference to FIGS. 2 and 13-14, the driver 10 further includes a lifter housing portion 292 positioned adjacent the storage chamber cylinder 30 (FIG. 2). The lifter housing portion 292 substantially encloses the lifter assembly 42. Furthermore, the lifter housing portion 292 includes a sensor 296 (e.g., a Hall-effect sensor) positioned at a location proximate the lifter 100 (FIG. 13). As discussed above, the lifter 100 includes the magnet 300 supported by the disk member 282. The sensor 296 and the magnet 300 are configured to indicate a position of the driver blade 26 (i.e., the ready position), as further discussed below.

Figure 15A:
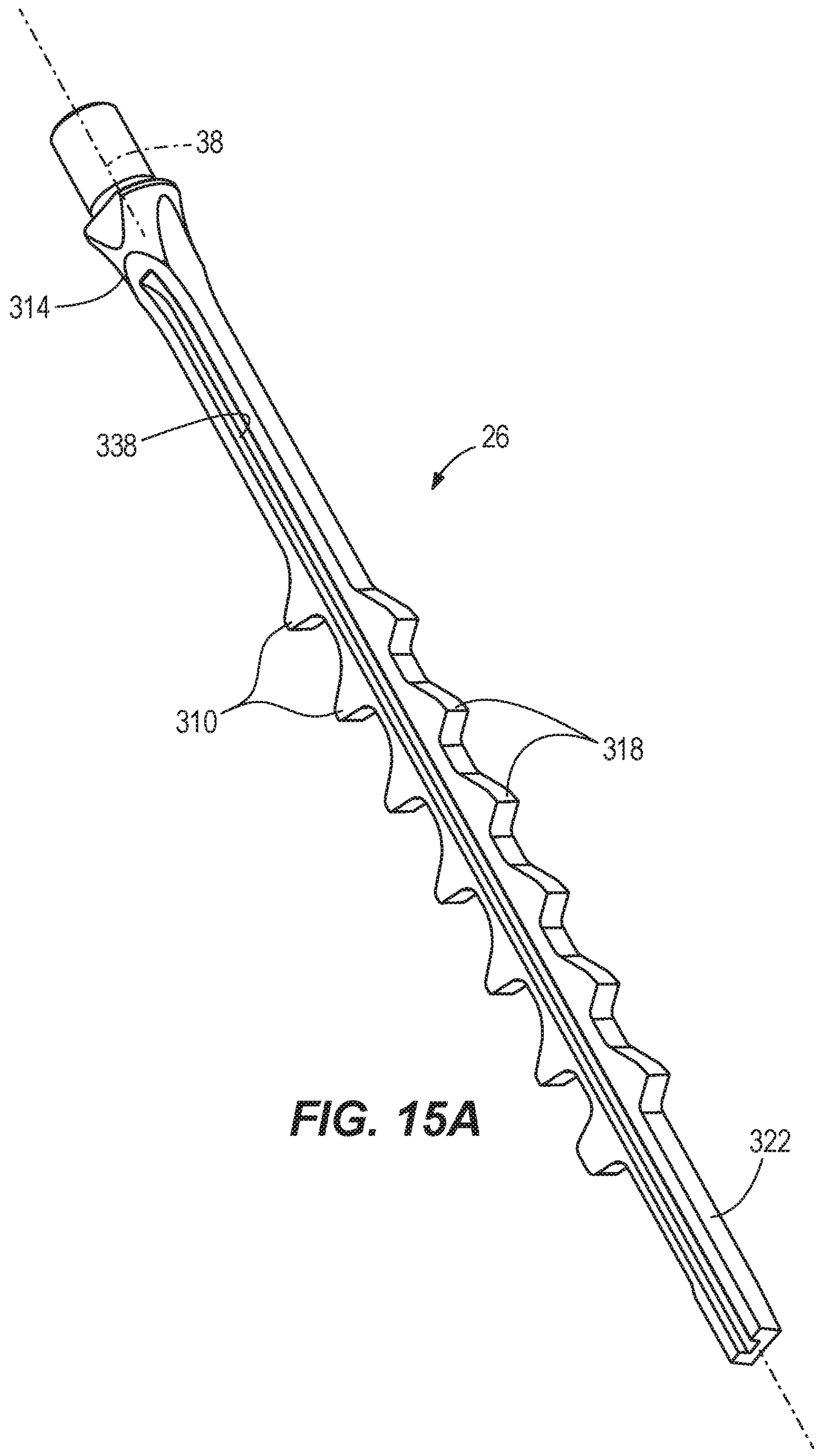
FIG. 15A is a perspective view of the driver blade.
Figure 15B:
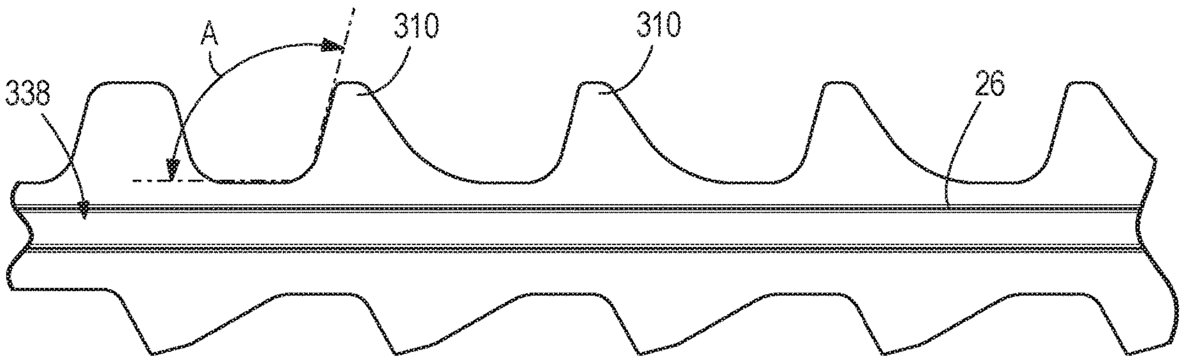
FIG. 15B is an enlarged plan view of the driver blade of FIG. 15A.

With reference to FIGS. 4, 15A, and 15B, the driver blade 26 includes teeth 310 along the length thereof, and the respective roller bushings 284 are engageable with the teeth 310 when returning the driver blade 26 from the driven position to the ready position. With reference to FIG. 15A, the teeth 310 extend from a first side 314 of the driver blade 26 in a non-perpendicular direction relative to the driving axis 38 defined by the driver blade 26. For example, the illustrated teeth 310 extend in a direction at an angle A of about 115 degrees relative to the driving axis 38 (FIG. 15B). The non-perpendicular direction that the teeth 310 extend may facilitate contact between the roller bushings 284. This may reduce stress applied to the teeth 310, thereby prolonging the life of the driver 10. The illustrated driver blade 26 includes eight teeth 310 such that two revolutions of the lifter 100 moves the driver blade 26 from the driven position to the ready position. Furthermore, because the roller bushings 284 are capable of rotating relative to the respective driver pins 276, sliding movement between the roller bushings 284 and the teeth 310 is inhibited when the lifter 100 is moving the driver blade 26 from the driven position to the ready position. As a result, friction and attendant wear on the teeth 310 that might otherwise result from sliding movement between the driver pins 276 and the teeth 310 is reduced.

The driver blade 26 further includes axially spaced projections 318, the purpose of which is described below, formed on a second side 322 opposite the teeth 310 (FIG. 15A). The illustrated driver blade 26 is manufactured such that each of the teeth 310 and the projections 318 are in the same plane (i.e., flat) as the driver blade 26. This may simplify manufacturing of the driver blade 26, and reduce the stresses applied to the driver blade 26 (i.e., the teeth 310, the projection 318, etc.).

With reference to FIGS. 2, 5, and 13-14, the driver 10 further includes a nosepiece guide 330 positioned at an end of the magazine 14. The nosepiece guide 330 forms a firing channel 334 (FIG. 5) in communication with a fastener channel 336 in the magazine 14 (FIGS. 13-14). The firing channel 334 is configured to consecutively receive fasteners from a collated fastener strip within the fastener channel 336 of the magazine 14. As stated above, the lifter assembly 42 moves the driver blade 26 from the driven position to the ready position. The sensor 296 determines the position of the driver blade 26 in response to detecting the magnet 300, which is positioned on the disk member 282 and which co-rotates with the lifter 100. Specifically, the magnet 300 is aligned with the sensor 296 when the driver blade 26 reaches the ready position, deactivating the motor 46 in response to an output from the sensor 296 to stop the driver blade 26 at the ready position (FIG. 13). In the ready position of the driver blade 26, the driver blade 26 is positioned above the fastener channel 336 such that the fastener may be received within the firing channel 334 prior to initiation of a firing cycle. For example, in the illustrated embodiment, the driver blade 26 is positioned about 0.63 inches above the fastener channel 336. This may allow a sufficient amount of time to load the subsequent fastener and reduce the probability of jamming of the driver 10.

With reference to FIGS. 15A and 15B, the driver blade 26 includes a slot 338 extending along the driving axis 38. The slot 338 is configured to receive a rib 342 (FIG. 16) extending from the nosepiece guide 330. The rib 342 is configured to facilitate movement of the driver blade 26 along the driving axis 38 and inhibit movement of the driver blade 26 off-axis. (i.e., left or right from the frame of reference in FIG. 16.)

With reference to FIGS. 2-3 and 13-14, the driver 10 further includes a latch assembly 350 having a pawl or latch 354 for selectively holding the driver blade 26 in the ready position, and a solenoid 358 for releasing the latch 354 from the driver blade 26. In other words, the latch assembly 350 is moveable between a latched state (FIG. 13) in which the driver blade 26 is held in the ready position against a biasing force (i.e., the pressurized gas in the storage chamber 30), and a released state (FIG. 14) in which the driver blade 26 is permitted to be driven by the biasing force from the ready position to the driven position. The latch 354 is pivotably supported by a shaft 362 on the nosepiece guide 330 about a latch axis 366 (FIG. 3). The latch axis 366 is parallel to a rotational axis 368 of the lifter 100 (FIG. 3). Specifically, the latch 354 is positioned between two bosses 370 of the nosepiece guide 330 such that the shaft 362 is supported on both sides by the nosepiece guide 330. This may reduce stress on the latch 354.

With reference to FIGS. 2 and 3, the latch assembly 350 is positioned proximate the side 322 of the driver blade 26. The solenoid 358 is supported by a boss 374 extending from the lifter housing portion 292 (FIG. 2). As such, the solenoid 358 defines a solenoid axis 398 that extends parallel to the driving axis 38 (i.e., to the lifter housing portion 292). Furthermore, the latch 354 is configured to rotate about the shaft 362 relative to the latch axis 366 such that a tip 378 of the latch 354 is configured to engage a stop surface 382 of the nosepiece guide 330 (FIG. 13) when the latch 354 is moved toward the driver blade 26, as further discussed below.

With reference to FIGS. 2 and 3, the solenoid 358 includes a solenoid plunger 386 for moving the latch 354 out of engagement with the driver blade 26 when transitioning from the latched state (FIG. 13) to the released state (FIG. 14). The plunger 386 includes a first end positioned within the solenoid 358 and a second end coupled to the latch 354 (FIG. 3). In the illustrated embodiment of the driver 10, the plunger 386 includes a slot 360 that receives a corresponding radially extending tab 364 on the latch 354 (FIG. 2). The tab 364 is loosely fitted within the slot 360 to permit the tab 364 to both translate and pivot within the slot 360 relative to the plunger 386.

Displacement of the plunger 386 pivots the latch 354 about the latch axis 366. Specifically, when the solenoid 358 is energized, the plunger 386 retracts along the solenoid axis 398 (FIG. 3) into the body of the solenoid 358, pivoting the latch 354 about the latch axis 366 in a clockwise direction from the frame of reference of FIG. 2, thereby making the latch 354 non-engageable with the driver blade 26 (FIG. 14). In other words, the latch 354 is spaced from the projections 318 of the driver blade 26, concluding the transition of the latch assembly 350 to the released state. When the solenoid 358 is de-energized, an internal spring bias within the solenoid 358 causes the plunger 386 of the solenoid 358 to extend along the solenoid axis 398, causing the latch 354 to pivot in an opposite direction about the latch axis 366. Specifically, as the plunger 386 extends, the latch 354 rotates about the latch axis 366 toward the driver blade 26, concluding the transition to the latched state shown in FIG. 13. In alternative embodiments, one or more springs may be used to separately bias the plunger 386 and/or the latch 354 to assist the internal spring bias within the solenoid 358 in returning the latch assembly 350 to the latched state.

The latch 354 is moveable between a latched position (coinciding with the latched state of the latch assembly 350 shown in FIG. 13) in which the latch 354 is engaged with one of the projections 318A on the driver blade 26 for holding the driver blade 26 in the ready position against the biasing force of the compressed gas, and a released position (coinciding with the released state of the latch assembly 350 shown in FIG. 14) in which the driver blade 26 is permitted to be driven by the biasing force of the compressed gas from the ready position to the driven position. Furthermore, the stop surface 270, against which the latch 354 is engageable when the solenoid 358 is de-energized, limits the extent to which the latch 354 is rotatable in a counter-clockwise direction from the frame of reference of FIG. 2 about the latch axis 366 upon return to the latched state.

With reference to FIGS. 2 and 3, the driver 10 further includes an arm member 410 positioned on an end 406 of the nosepiece guide 330. The arm member 410 includes a first end 414 and a second end 418 positioned opposite the first end 414 along the driving axis 38. The first end 414 is proximate the end 406 and configured to engage the workpiece. The second end 418 may be connected to a depth of drive adjustment mechanism 422. Specifically, a depth that the arm portion 410 extends relative to the end 406 of the nosepiece guide 330 is adjustable using the depth of drive adjustment mechanism 422. Furthermore, the illustrated driver 10 includes a bracket member 426 positioned between the lifter housing portion 292 and the nosepiece guide 330 (FIG. 2). The bracket member 426 is configured to support the arm portion 410 and the depth of drive adjustment mechanism 422. The bracket member 426 may be secured to the driver 10 by the lifter housing portion 292 and the nosepiece guide 330. The bracket member 426 may reduce additional mounting brackets, fasteners such as screws, and/or assembly time.

With reference to FIG. 5, the driver 10 includes a bumper 442 positioned beneath the piston 22 for stopping the piston 22 at the driven position (FIG. 6A) and absorbing the impact energy from the piston 22. The bumper 442 is configured to distribute the impact force of the piston 22 uniformly throughout the bumper 442 as the piston 22 is rapidly decelerated upon reaching the driven position (i.e., the bottom dead center position).

With reference to FIG. 5, the bumper 442 is received within the cylinder 18 and clamped into place by the lifter housing portion 292, which is threaded to the bottom end of the cylinder 18. The bumper 442 is received within a cutout 454 formed in the lifter housing portion 292. The cutout 454 coaxially aligns the bumper 442 with respect to the driver blade 26. In alternative embodiments, the lifter housing portion 292 and the bumper 442 may be supplemented with additional structure for inhibiting relative rotation between the bumper 442 and the recess 446 (e.g., a key and keyway arrangement).

Figure 17:
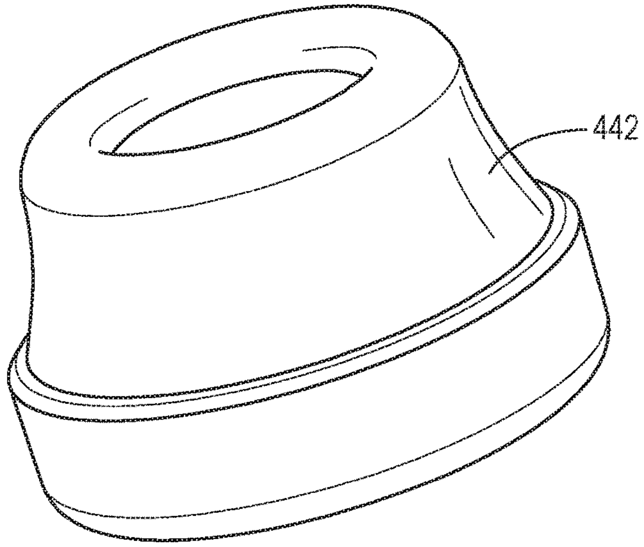
FIG. 17 is a perspective view of a bumper of the gas spring-powered fastener driver of FIG. 1.

With reference to FIGS. 5 and 17, the bumper 442 has a volume. The volume is limited by the size of the cylinder 18. The volume of the bumper 442 may be maximized to fit within the cylinder 18 such that a thermal heat capacity of the bumper 442 may be increased. In particular, the bumper 442 may experience high temperatures due to the expansion of gas within the cylinder 18 during consecutive firing cycles. Furthermore, a surface area of the bumper 442 in contact with its surrounding structure may be increased, thus increasing the rate of heat transfer that occurs between the bumper 442 and its surrounding structure (e.g., the cylinder 18, etc.).

Figure 18:
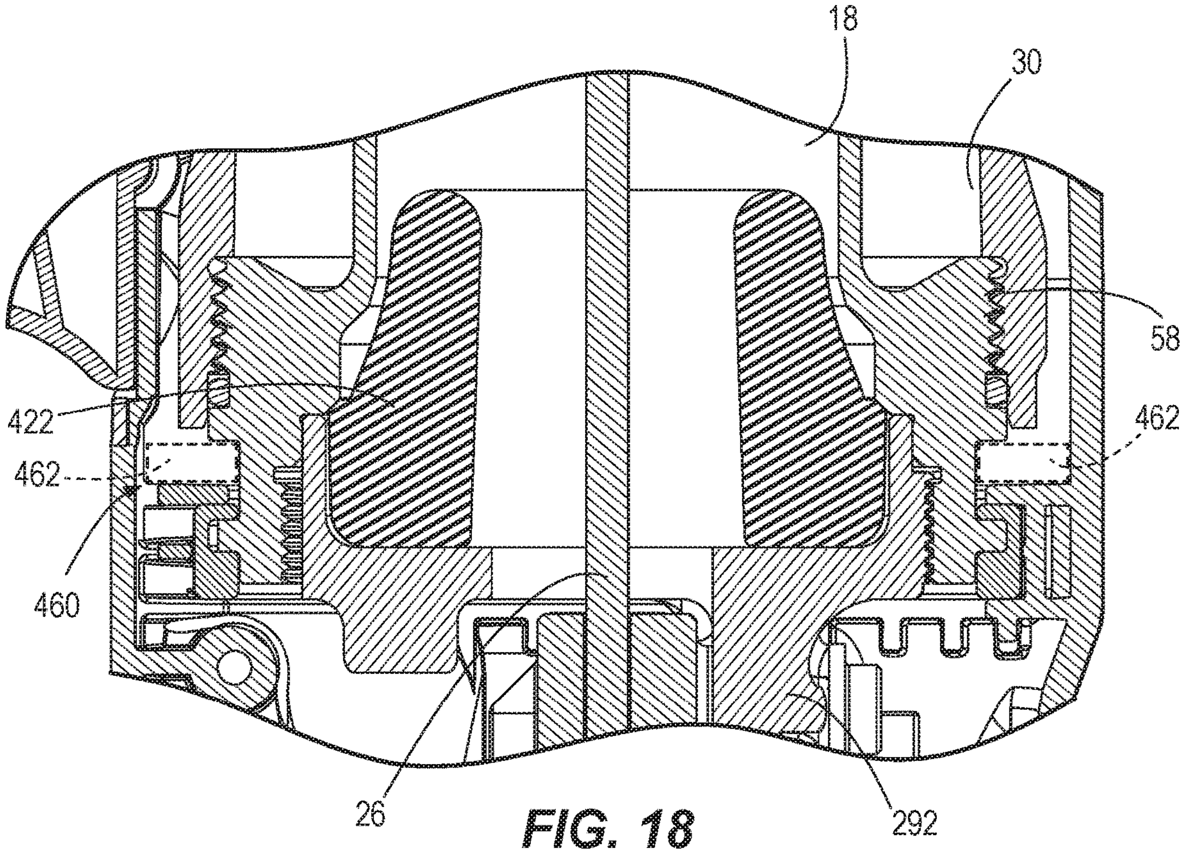
FIG. 18 is a partial cross-sectional view of the gas spring-powered fastener driver of FIG. 1, illustrating phase change material proximate the bumper.

With reference to FIGS. 5 and 18, the driver 10 further includes an annular pocket 460 around the cylinder 18. A heat sink 462 (FIG. 18) may be positioned within the pocket 460 and in thermal contact with the bumper 442 (e.g., by conduction, convection, or a combination thereof). The heat sink 462 is formed of thermally conductive material to further increase heat transfer from the bumper 442, thereby cooling the bumper 442. In one embodiment of the driver 10, the material is a phase change material (PCM), which slowly absorbs heat from the bumper 442 during the course of operation of the driver 10, keeping the temperature of the bumper 442 relatively low without substantially increasing the weight of the driver 10. This may inhibit bumper failure and prolong the useful life of the driver 10.

Figure 19:
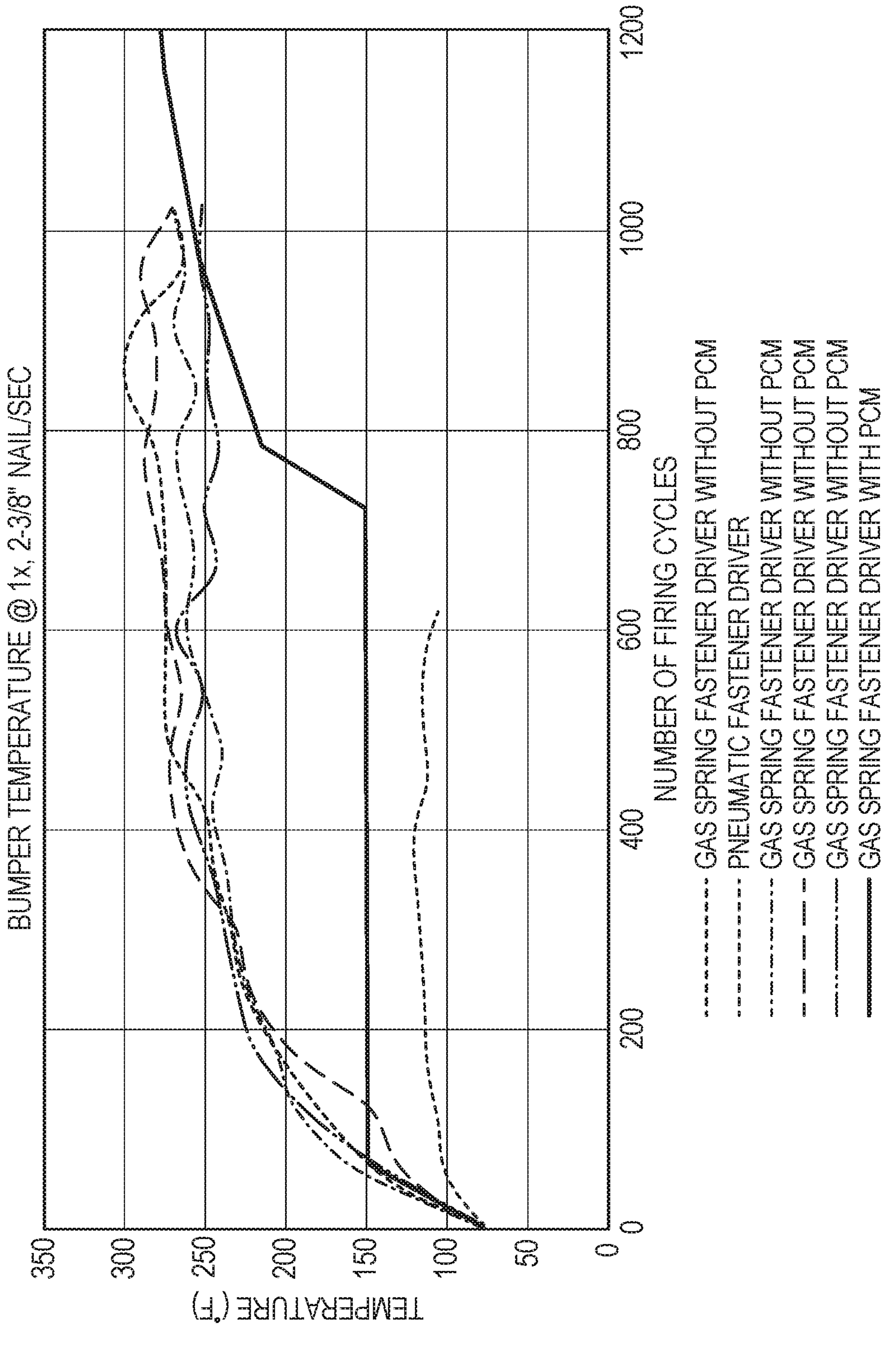
FIG. 19 is a graph illustrating a temperature of the bumper of FIG. 17 over a number of firing cycles with phase change material proximate the bumper.

For example, as illustrated in FIG. 19, an increase in the temperature of the bumper 442 is substantially inhibited for about 900 firing cycles of the driver 10 having the phase change material relative to bumpers in similar fastener drivers without the phase change material positioned proximate the bumpers. Further, as shown in FIG. 19, the phase change material is configured to maintain the bumper 442 at a temperature of 150 degrees Fahrenheit or less for at least 600 firing cycles. As such, the increase in the temperature of the bumper 442 may be substantially inhibited for a longer period of time than fastener drivers without the phase changer material positioned proximate the bumpers. In particular, the phase change material may be configured to change phase at a predetermined temperature limit. The predetermined temperature limit may be determined based on the temperature the bumper 442 reaches at which permanent damage to the bumper 442 might otherwise occur. Furthermore, the amount of phase change material positioned in the pocket 460 may be determined based on the desired overall weight and/or size of the driver 10 while maximizing thermal protection of the bumper 442.

With reference to FIGS. 6A-6B and 13-14, the operation of a firing cycle for the driver 10 is illustrated and detailed below. With reference to FIGS. 6B and 13, prior to initiation a firing cycle, the driver blade 26 is held in the ready position with the piston 22 near top dead center within the cylinder 18. More specifically, the bushing 284 associated with the driver pin 276A (FIG. 13) on the lifter 100 is engaged with a lower-most tooth 310A of the axially spaced teeth 310 on the driver blade 26, and the rotational position of the lifter 100 is maintained by the one-way clutch mechanism 154. In other words, as previously described, the one-way clutch mechanism 154 prevents the motor 46 from being back-driven by the transmission 92 when the lifter 100 is holding the driver blade 26 in the ready position. Also, in the ready position of the driver blade 26 (FIG. 13), the latch 354 is engageable with a lower-most projection 318A on the driver blade 26, though not necessarily in contact with and functioning to maintain the driver blade 26 in the ready position. Rather, the latch 354 at this instant provides a safety function to prevent the driver blade 26 from inadvertently firing should the one-way clutch mechanism 154 fail.

With reference to FIG. 14, upon the trigger 48 being pulled to initiate a firing cycle, the solenoid 358 is energized to pivot the latch 354 from the latched position shown in FIG. 13 to the release position shown in FIG. 14, thereby repositioning the latch 354 so that it is no longer engageable with the projection 318A (defining the released state of the latch assembly 350). At about the same time, the motor 46 is activated to rotate the transmission output shaft 96 and the lifter 100 in a counter-clockwise direction from the frame of reference of FIG. 4, thereby displacing the driver blade 26 upward past the ready position a slight amount before the lower-most tooth 310 on the driver blade 26 slips off the driver pin 276A (at the TDC position of the driver blade 26). Because the roller bushings 284 are rotatable relative to the driver pins 276 upon which they are supported, subsequent wear to the driver pin 276 and the teeth 310 is reduced. Thereafter, the piston 22 and the driver blade 26 are thrust downward toward the driven position (FIG. 6A) by the expanding gas in the cylinder 18 and storage chamber cylinder 30. As the driver blade 26 is displaced toward the driven position, the motor 46 remains activated to continue counter-clockwise rotation of the lifter 100.

With reference to FIG. 5, upon a fastener being driven into a workpiece, the piston 22 impacts the bumper 442 to quickly decelerate the piston 22 and the driver blade 26, eventually stopping the piston 22 in the driven or bottom dead center position.

Figure 16:
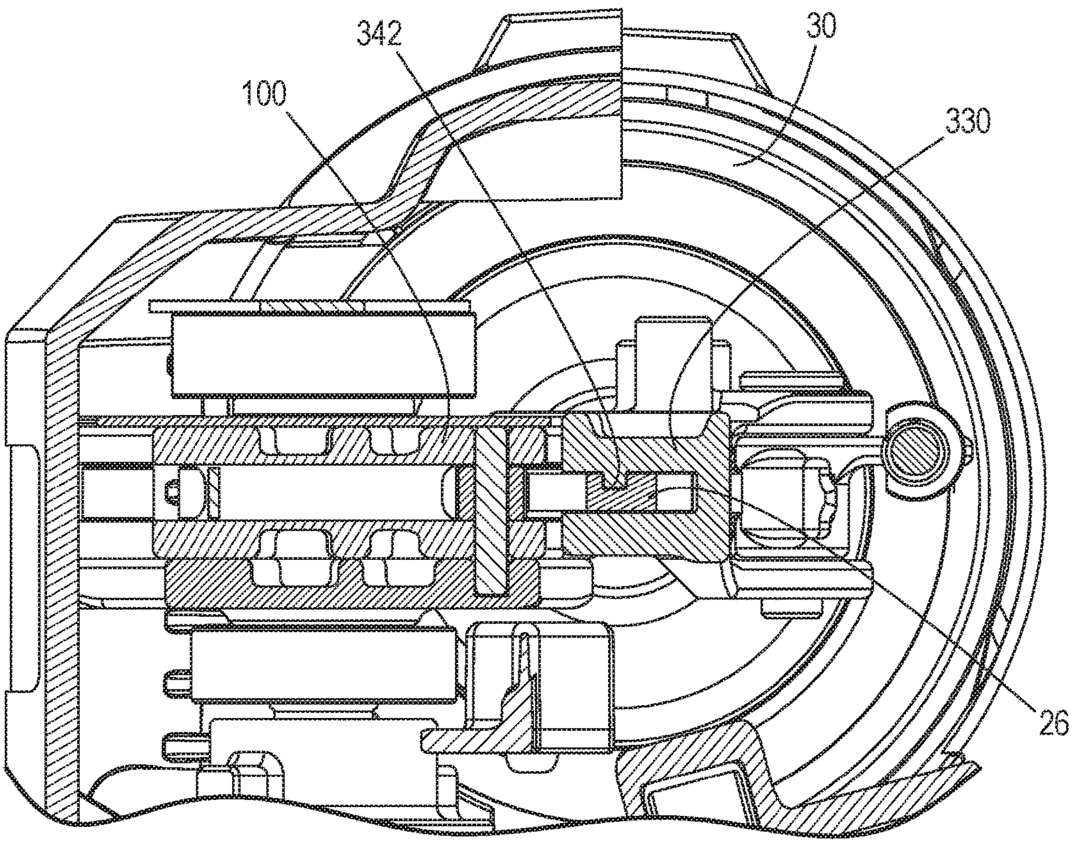
FIG. 16 is a bottom view of the fastener driver of FIG. 1, illustrating the driver blade supported within a nosepiece guide.

With reference to FIG. 16, shortly after the driver blade 26 reaches the driven position, a first of the driver pins 276 on the lifter 100 engages one of the teeth 310 on the driver blade 26 and continued counter-clockwise rotation of the lifter 100 raises the driver blade 26 and the piston 22 toward the ready position. Shortly thereafter and prior to the lifter 100 making one complete rotation, the solenoid 358 is de-energized, permitting the latch 354 to re-engage the driver blade 26 and ratchet around the projections 318 as upward displacement of the driver blade 26 continues (defining the latched state of the latch assembly 350).

After one complete rotation of the lifter 100 occurs, the latch 218 maintains the driver blade 26 in an intermediate position between the driven position and the ready position while the lifter 100 continues counter-clockwise rotation (from the frame of reference of FIG. 4) until the first of the driver pins 276A re-engages another of the teeth 310 on the driver blade 26. Continued rotation of the lifter 100 raises the driver blade 26 to the ready position, which is detected by the sensor 296 as described above. Should the driver blade 26 seize during its return stroke (i.e., from an obstruction caused by foreign debris), the torque-limiting clutch mechanism 214 slips, diverting torque from the motor 46 to the ring gear 138 in the second planetary stage 86 and causing the ring gear 190 of the third planetary stage 108 to rotate within the cover 210. As a result, excess force is not applied to the driver blade 26 which might otherwise cause breakage of the lifter 100 and/or the teeth 310 on the driver blade 26.

Although the invention has been described in detail with reference to certain preferred embodiments, variations and modifications exist within the scope and spirit of one or more independent aspects of the invention as described.

Various features of the invention are set forth in the following claims.

What is claimed is:

1. A gas spring-powered fastener driver comprising:

a cylinder;

a moveable piston positioned within the cylinder;

a driver blade attached to the piston and movable therewith between a ready position and a driven position;

a lifter operable to move the driver blade from the driven position toward the ready position;

a transmission for providing torque to the lifter; and a latch assembly movable between a latched state in which the driver blade is held in the ready position against a biasing force of compressed gas, and a released state in which the driver blade is permitted to be driven by the biasing force toward the driven position, the latch assembly including a latch including a radially extending tab, and a solenoid for moving the latch out of engagement with the driver blade when transitioning from the latched state to the released state, the solenoid defining a solenoid axis that is positioned parallel to a driving axis defined by the driver blade, wherein the solenoid further includes a plunger, wherein a first end of the plunger is positioned within the solenoid, and a second end opposite the first end includes a slot in which the radially extending tab is loosely fitted to permit the radially extending tab to move within the slot as the latch assembly moves between the latched state and the released state.

2. The gas spring-powered fastener driver of claim 1, wherein when the solenoid is energized, the plunger is displaced along the solenoid axis into a body of the solenoid, thereby moving the latch away from the driver blade and toward the released state.

3. The gas spring-powered fastener driver of claim 1, wherein the solenoid further includes a spring for biasing the plunger toward an extended position relative to a body of the solenoid along the solenoid axis when the solenoid is de-energized, and wherein a biasing force of the spring moves the latch toward the driver blade and into the latched state.

4. The gas spring-powered fastener driver of claim 1, further comprising a nosepiece guide coupled to the cylinder, wherein the latch assembly further includes a shaft, and wherein the latch is pivotably supported by the shaft on the nosepiece guide about a latch axis that is parallel with a rotational axis of the lifter.

5. The gas spring-powered fastener driver of claim 4, wherein the nosepiece guide includes two support members spaced from each other along the latch axis, wherein the shaft is supported at each end by the respective support members, and wherein the latch is positioned between the two support members.

6. The gas spring-powered fastener driver of claim 4, wherein the shaft defines the latch axis, and wherein the latch axis is substantially perpendicular to the solenoid axis and the driving axis.

7. The gas spring-powered fastener driver of claim 1, wherein the driver blade includes a first side and a second side extending along the driving axis, and wherein the latch assembly is positioned proximate one of the first side or the second side of the driver blade.

8. The gas spring-powered fastener driver of claim 1, wherein the driver blade includes a plurality of projections extending therefrom, and wherein the latch is engageable with one of the projections when the latch is in the latched state.

9. The gas spring-powered fastener driver of claim 1, wherein the cylinder is an inner cylinder positioned within an outer cylinder, wherein the driver blade is movable with the piston between a top-dead-center (TDC) position and a bottom-dead-center (BDC) position coinciding with the driven position;

wherein the outer cylinder and the inner cylinder define a first total volume in which gas is located when the piston and driver blade are in the TDC position, wherein the outer cylinder and the inner cylinder define a second total volume, which is greater than the first total volume, in which gas is located when the piston and driver blade are in the BDC position, wherein a compression ratio of the second total volume to the first total volume is 1.7:1 or less, and wherein a force acting on the piston when located in the TDC position is at least 90 pound-force (lbf) but no more than 450 lbf.

10. The gas spring-powered fastener driver of claim 9, wherein the compression ratio of the second total volume to the first total volume is 1.61:1.

11. The gas spring-powered fastener driver of claim 10, wherein when the compression ratio is 1.61:1, a pressure of the gas in the outer cylinder when the piston and the driver blade are in the BDC position is 108 pounds per square inch (psi) at a temperature of 70 degrees Fahrenheit (° F.), and the pressure of the gas in the outer cylinder when the piston and the driver blade are in the TDC position is 174 psi.

12. The gas spring-powered fastener driver of claim 11, wherein a stroke length of the driver blade is a distance the driver blade travels between the TDC position and the BDC position, wherein the stroke length is between 4.4 inches and 4.8 inches.

13. The gas spring-powered fastener driver of claim 12, wherein the stroke length is about 4.6 inches.

14. The gas spring-powered fastener driver of claim 9, wherein a stroke length of the driver blade is a distance the driver blade travels between the TDC position and the BDC position, wherein the stroke length is between 4.1 inches and 5.1 inches.

15. The gas spring-powered fastener driver of claim 14, wherein the stroke length is about 4.6 inches.

16. The gas spring-powered fastener driver of claim 9, wherein the force acting on the piston when located in the TDC position is no more than 435 lbf.

* * * * *